United States Patent
Bai et al.

(10) Patent No.: US 11,659,572 B2
(45) Date of Patent: May 23, 2023

(54) PRIORITIZING BROADCAST AND UNICAST TRANSMISSIONS

(71) Applicant: QUALCOMM Incorporated, San Diego, CA (US)

(72) Inventors: Tianyang Bai, Somerville, NJ (US); Tao Luo, San Diego, CA (US); Wooseok Nam, San Diego, CA (US); Sungwoo Park, San Diego, CA (US); Kiran Venugopal, Raritan, NJ (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 17/081,823

(22) Filed: Oct. 27, 2020

(65) Prior Publication Data
US 2021/0160816 A1  May 27, 2021

Related U.S. Application Data

(60) Provisional application No. 62/940,685, filed on Nov. 26, 2019.

(51) Int. Cl.
*H04W 72/00* (2023.01)
*H04W 72/10* (2009.01)
(Continued)

(52) U.S. Cl.
CPC .......... *H04W 72/005* (2013.01); *H04L 5/0051* (2013.01); *H04W 8/24* (2013.01);
(Continued)

(58) Field of Classification Search
CPC ..... H04W 72/005; H04W 8/24; H04W 24/08; H04W 72/046; H04W 72/10;
(Continued)

(56) References Cited

U.S. PATENT DOCUMENTS

2018/0227094 A1*  8/2018  Liu ..................... H04W 72/046
2019/0260445 A1*  8/2019  John Wilson ........ H04B 7/0634
(Continued)

FOREIGN PATENT DOCUMENTS

WO  WO-2018017840 A1 *  1/2018  .......... H04B 7/0617

OTHER PUBLICATIONS

Ericsson: "On Simultaneous Reception of Physical and Reference Signals Across," 3GPP Draft, 3GPP TSG RAN WG1 Meeting #92bis, R1-1804977, On Simultaneous Reception of Physical and Reference Signals Across CCS, 3rd Generation Partnership Project (3GPP), Mobile Competence Centre, 650, Route Des Lucioles, F-06921, Sophia-Antipolis Cedex, France, vol. RAN WG1, No. Sanya, China, Apr. 16, 2018-Apr. 20, 2018, Apr. 15, 2018 (Apr. 15, 2018), XP051427238, 12 pages, Retrieved from the Internet: URL: http://www.3gpp.org/ftp/Meetings%5F3GPP%5FSYNC/RAN1/Docs/ [retrieved on Apr. 15, 2018] pp. 1-9.
(Continued)

*Primary Examiner* — Ian N Moore
*Assistant Examiner* — Latresa A McCallum
(74) *Attorney, Agent, or Firm* — Danai Nelisile Mhembere; Holland & Hart LLP

(57) ABSTRACT

Methods, systems, and devices for wireless communications are described. A user equipment (UE) may identify a priority rule for selecting to monitor a first beam associated with a first broadcast transmission or a second beam that differs from the first beam and is associated with a unicast transmission. The UE may use the priority rule when a scheduling conflict is identified between the first broadcast transmission and the unicast transmission. Such conflicts may include at least one of a broadcast transmission, a control resource set (CORESET) monitoring occasion of the broadcast transmission, or reference signals of the broadcast transmission at least partially overlapping with a unicast transmission, a
(Continued)

CORESET monitoring occasion of the unicast transmission, or reference signals associated with the unicast transmission. The UE may monitor, in accordance with the priority rule, one of the first beam or the second beam based on identification of scheduling conflict.

26 Claims, 17 Drawing Sheets

(51) Int. Cl.
*H04W 72/044* (2023.01)
*H04W 8/24* (2009.01)
*H04W 72/14* (2009.01)
*H04L 5/00* (2006.01)
*H04W 24/08* (2009.01)

(52) U.S. Cl.
CPC ......... *H04W 24/08* (2013.01); *H04W 72/046* (2013.01); *H04W 72/10* (2013.01); *H04W 72/14* (2013.01)

(58) Field of Classification Search
CPC ..... H04W 72/14; H04W 28/16; H04W 72/00; H04W 60/06; H04W 16/18; H04W 16/28; H04W 28/12; H04L 5/0051; H04L 41/145; H04L 43/00; H04M 1/72406
See application file for complete search history.

(56) References Cited

U.S. PATENT DOCUMENTS

2020/0154474 A1* 5/2020 Lo .................. H04W 72/048
2020/0329368 A1* 10/2020 Sharma ................ H04W 4/12

OTHER PUBLICATIONS

Huawei, et al., "Corrections on Scheduling and HARQ", 3GPP Draft, 3GPP TSG RAN WG1 Meeting #94bis, R1-1810113, 3rd Generation Partnership Project (3GPP), Mobile Competence Centre, 650, Route Des Lucioles, F-06921, Sophia-Antipolis Cedex, France, vol. RAN WG1, No. Chengdu, China; Oct. 8, 2018-Oct. 12, 2018, Sep. 29, 2018 (Sep. 29, 2018), XP051517528, 15 pages, Retrieved from the Internet: URL: http://www.3gpp.org/ftp/tsg%5Fran/WG1%5FRL1/TSGR1%5F94b/Docs/R1%2D1810113%2Ezip [retrieved on Sep. 29, 2018] pp. 6-7, 4 Slot aggregation pp. 7-8, 5 Data scheduling and HARQ.

Huawei, et al., "Simultaneous Rx or Tx Over CC/BWP(s)", 3GPP Draft, 3GPP TSG RAN WG1 Meeting #95, R1-1812241,3rd Generation Partnership Project (3GPP), Mobile Competence Centre, 650, Route Des Lucioles, F-06921, Sophia-Antipolis Cedex, France, vol. RAN WG1, No. Spokane, USA, Nov. 12, 2018-Nov. 16, 2018, Nov. 11, 2018 (Nov. 11, 2018), XP051554123, 4 pages, Retrieved from the Internet: URL: http://www.3gpp.org/ftp/Meetings%5F3GPP%5FSYNC/RAN1/Docs/R1%2D1812241%2Ezip [retrieved on Nov. 11, 2018] the whole document.

International Search Report and Written Opinion—PCT/US2020/057679—ISA/EPO—dated Dec. 21, 2020 (200489WO).

Qualcomm Incorporated: "Discussion on Simultaneous POSCH Reception," 3GPP Draft, 3GPP TSG-RAN WG1 Meeting AH 1801, R1-1803526 Summary 7.1.3.3.2 Simultaneous Posch, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 26, 2018-Mar. 2, 2018, Mar. 5, 2018 (Mar. 5, 2018), XP051398824, pp. 1-11, Retrieved from the Internet: URL: http://www.3gpp.org/ftp/tsg%5Fran/WG1%5FRL1/TSGR1%5F92/Docs/ [retrieved on Mar. 5, 2018] the whole document.

* cited by examiner

PRIORITIZING BROADCAST AND UNICAST TRANSMISSIONS

CROSS REFERENCE

The present Application for Patent claims the benefit of U.S. Provisional Patent Application No. 62/940,685 by BAI et al., entitled "PRIORITIZING BROADCAST AND UNICAST TRANSMISSIONS," filed Nov. 26, 2019, assigned to the assignee hereof, and expressly incorporated by reference herein.

FIELD OF TECHNOLOGY

The following relates generally to wireless communications and more specifically to prioritizing broadcast and unicast transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may monitor for physical downlink control channel (PDCCH) transmissions from a base station on a control resource set (CORESET). The PDCCH transmission may allocate resources for a physical downlink shared channel (PDSCH) transmission. If the UE successfully receives and decodes the PDSCH transmission, the UE may transmit an acknowledgement (ACK) to the base station. Alternatively, if the UE fails to successfully receive and decode the PDSCH transmission, the UE may transmit a negative acknowledgement (NACK) to the base station.

SUMMARY

The described techniques relate to improved methods, systems, devices, and apparatuses that support prioritizing broadcast and unicast transmissions. Generally, the described techniques provide for a user equipment (UE) to identify a priority rule for selecting to monitor a first beam associated with a first broadcast transmission (e.g., a transmission of broadcast control information) or a second beam that differs from the first beam and is associated with a unicast transmission. The UE may use the priority rule when a scheduling conflict is identified between the first broadcast transmission and the unicast transmission. Such conflicts may include at least one of a broadcast transmission, a control resource set (CORESET) monitoring occasion of the broadcast transmission, or reference signals of the broadcast transmission at least partially overlapping with a unicast transmission, a CORESET monitoring occasion of the unicast transmission, or reference signals associated with the unicast transmission. The UE may monitor, in accordance with the priority rule, one of the first beam or the second beam based on identification of scheduling conflict. As there may be situations where the UE is unable to receive the first broadcast transmission and the unicast transmission when receiving both within a threshold amount of time, selecting between the first and second beam may enable the UE to determine whether to receive the first broadcast transmission or the unicast transmission.

A method for wireless communications by a UE is described. The method may include identifying a priority rule for selecting to monitor a first beam associated with a first broadcast transmission, or a second beam that differs from the first beam and is associated with a unicast transmission, when a scheduling conflict is identified between the first broadcast transmission and the unicast transmission and monitoring, in accordance with the priority rule, one of the first beam or the second beam based on identification of the scheduling conflict.

An apparatus for wireless communications by a UE is described. The apparatus may include a processor, memory in electronic communication with the processor, and instructions stored in the memory. The instructions may be executable by the processor to cause the apparatus to identify a priority rule for selecting to monitor a first beam associated with a first broadcast transmission, or a second beam that differs from the first beam and is associated with a unicast transmission, when a scheduling conflict is identified between the first broadcast transmission and the unicast transmission and monitor, in accordance with the priority rule, one of the first beam or the second beam based on identification of the scheduling conflict.

Another apparatus for wireless communications by a UE is described. The apparatus may include means for identifying a priority rule for selecting to monitor a first beam associated with a first broadcast transmission, or a second beam that differs from the first beam and is associated with a unicast transmission, when a scheduling conflict is identified between the first broadcast transmission and the unicast transmission and means for monitoring, in accordance with the priority rule, one of the first beam or the second beam based on identification of the scheduling conflict.

A non-transitory computer-readable medium storing code for wireless communications by a UE is described. The code may include instructions executable by a processor to identify a priority rule for selecting to monitor a first beam associated with a first broadcast transmission, or a second beam that differs from the first beam and is associated with a unicast transmission, when a scheduling conflict is identified between the first broadcast transmission and the unicast transmission and monitor, in accordance with the priority rule, one of the first beam or the second beam based on identification of the scheduling conflict.

Some examples of the method, apparatuses, and non-transitory computer-readable medium described herein may further include operations, features, means, or instructions for receiving the first broadcast transmission using the first beam based on the priority rule indicating to select to monitor the first broadcast transmission.

Some examples of the method, apparatuses, and non-transitory computer-readable medium described herein may further include operations, features, means, or instructions for receiving the unicast transmission using the second beam based on the priority rule indicating to select to monitor the unicast transmission.

In some examples of the method, apparatuses, and non-transitory computer-readable medium described herein, identifying the priority rule may include operations, features, means, or instructions for receiving control signaling indicating the priority rule.

In some examples of the method, apparatuses, and non-transitory computer-readable medium described herein, receiving the control signaling may include operations, features, means, or instructions for receiving the control signaling indicating the priority rule that specifies a priority of a broadcast control resource set associated with the first broadcast transmission relative to a second control resource set associated with the unicast transmission.

In some examples of the method, apparatuses, and non-transitory computer-readable medium described herein, identifying the priority rule may include operations, features, means, or instructions for retrieving the priority rule from a storage device of the UE.

In some examples of the method, apparatuses, and non-transitory computer-readable medium described herein, monitoring one of the first beam or the second beam may include operations, features, means, or instructions for monitor, using the first beam, a broadcast control resource set for the first broadcast transmission that may be a physical downlink control channel transmission.

In some examples of the method, apparatuses, and non-transitory computer-readable medium described herein, the broadcast control resource set may be a configured dedicated broadcast control resource set.

Some examples of the method, apparatuses, and non-transitory computer-readable medium described herein may further include operations, features, means, or instructions for receiving a first grant in a broadcast control resource set scheduling the first broadcast transmission that may be a data transmission in a first resource, and receiving a second grant scheduling the unicast transmission in a second resource that occurs within a defined amount of time of the first resource.

Some examples of the method, apparatuses, and non-transitory computer-readable medium described herein may further include operations, features, means, or instructions for transmitting feedback to a base station indicating that the UE did not receive and successfully decode the unicast transmission, and receiving a retransmission of the unicast transmission from the base station based on transmitting the feedback.

Some examples of the method, apparatuses, and non-transitory computer-readable medium described herein may further include operations, features, means, or instructions for transmitting feedback to a base station indicating that the UE did not receive and successfully decode the first broadcast transmission, and receiving a retransmission of the first broadcast transmission from the base station based on transmitting the feedback.

In some examples of the method, apparatuses, and non-transitory computer-readable medium described herein, the first resource and the second resource at least partially overlap in time, frequency, or both.

In some examples of the method, apparatuses, and non-transitory computer-readable medium described herein, the first resource and the second resource may be the same resource.

Some examples of the method, apparatuses, and non-transitory computer-readable medium described herein may further include operations, features, means, or instructions for receiving a first grant in a broadcast control channel scheduling the first broadcast transmission in a first resource, the first grant being scrambled with a group identifier of a group to which the UE belongs, and receiving a second grant scheduling the unicast transmission in a second resource that occurs within a defined amount of time of the first resource.

Some examples of the method, apparatuses, and non-transitory computer-readable medium described herein may further include operations, features, means, or instructions for identifying the scheduling conflict based on a first monitoring occasion resource for a broadcast control resource set at least partially overlapping with a second monitoring occasion resource associated with the unicast transmission.

In some examples of the method, apparatuses, and non-transitory computer-readable medium described herein, identifying the scheduling conflict may include operations, features, means, or instructions for identifying the scheduling conflict based on a blind decoding candidate within the first monitoring occasion resource at least partially overlapping with the second monitoring occasion resource.

In some examples of the method, apparatuses, and non-transitory computer-readable medium described herein, identifying the scheduling conflict may include operations, features, means, or instructions for identifying the scheduling conflict based on the UE being configured to use the first beam to monitor the first monitoring occasion resource and being configured to use the second beam to monitor the second monitoring occasion resource.

Some examples of the method, apparatuses, and non-transitory computer-readable medium described herein may further include operations, features, means, or instructions for identifying the scheduling conflict based on the first broadcast transmission being one or more reference signals of a broadcast control resource set that at least partially overlap with a resource of the unicast transmission.

In some examples of the method, apparatuses, and non-transitory computer-readable medium described herein, identifying the scheduling conflict may include operations, features, means, or instructions for identifying the scheduling conflict based on the first broadcast transmission being one or more first reference signals of a broadcast control resource set that at least partially overlap with one or more second reference signals of the unicast transmission.

Some examples of the method, apparatuses, and non-transitory computer-readable medium described herein may further include operations, features, means, or instructions for transmitting a monitoring capability of the UE, and receiving control signaling indicating the priority rule based on the monitoring capability.

In some examples of the method, apparatuses, and non-transitory computer-readable medium described herein, the monitoring capability indicates whether the UE may be capable of simultaneously receiving the first broadcast transmission and the unicast transmission within a resource that at least partially overlaps in time.

In some examples of the method, apparatuses, and non-transitory computer-readable medium described herein, the monitoring capability indicates a number of receiver filters, antenna panels, or both, of the UE.

In some examples of the method, apparatuses, and non-transitory computer-readable medium described herein, the monitoring capability indicates a beam switch timing capability of the UE.

A method for wireless communications by a base station is described. The method may include transmitting control signaling indicating a priority rule for a UE to apply for selecting to monitor a first beam associated with a first broadcast transmission, or a second beam that differs from the first beam and is associated with a unicast transmission, when a scheduling conflict is identified between the first broadcast transmission and the unicast transmission and transmitting the first broadcast transmission using the first beam and the unicast transmission using the second beam.

An apparatus for wireless communications by a base station is described. The apparatus may include a processor, memory in electronic communication with the processor, and instructions stored in the memory. The instructions may be executable by the processor to cause the apparatus to transmit control signaling indicating a priority rule for a UE to apply for selecting to monitor a first beam associated with a first broadcast transmission, or a second beam that differs from the first beam and is associated with a unicast transmission, when a scheduling conflict is identified between the first broadcast transmission and the unicast transmission and transmit the first broadcast transmission using the first beam and the unicast transmission using the second beam.

Another apparatus for wireless communications by a base station is described. The apparatus may include means for transmitting control signaling indicating a priority rule for a UE to apply for selecting to monitor a first beam associated with a first broadcast transmission, or a second beam that differs from the first beam and is associated with a unicast transmission, when a scheduling conflict is identified between the first broadcast transmission and the unicast transmission and means for transmitting the first broadcast transmission using the first beam and the unicast transmission using the second beam.

A non-transitory computer-readable medium storing code for wireless communications by a base station is described. The code may include instructions executable by a processor to transmit control signaling indicating a priority rule for a UE to apply for selecting to monitor a first beam associated with a first broadcast transmission, or a second beam that differs from the first beam and is associated with a unicast transmission, when a scheduling conflict is identified between the first broadcast transmission and the unicast transmission and transmit the first broadcast transmission using the first beam and the unicast transmission using the second beam.

In some examples of the method, apparatuses, and non-transitory computer-readable medium described herein, transmitting the control signaling may include operations, features, means, or instructions for transmitting the control signaling indicating the priority rule that specifies a priority of a broadcast control resource set associated with the first broadcast transmission relative to a second control resource set associated with the unicast transmission.

In some examples of the method, apparatuses, and non-transitory computer-readable medium described herein, transmitting the first broadcast transmission using the first beam may include operations, features, means, or instructions for transmitting a physical downlink control channel transmission within a broadcast control resource set.

In some examples of the method, apparatuses, and non-transitory computer-readable medium described herein, the broadcast control resource set may be a configured dedicated broadcast control resource set.

Some examples of the method, apparatuses, and non-transitory computer-readable medium described herein may further include operations, features, means, or instructions for transmitting a first grant in a broadcast control resource set scheduling the first broadcast transmission that may be a data transmission in a first resource, and transmitting a second grant scheduling the unicast transmission in a second resource that occurs within a defined amount of time of the first resource.

In some examples of the method, apparatuses, and non-transitory computer-readable medium described herein, the first resource and the second resource at least partially overlap in time, frequency, or both.

In some examples of the method, apparatuses, and non-transitory computer-readable medium described herein, the first resource and the second resource may be the same resource.

Some examples of the method, apparatuses, and non-transitory computer-readable medium described herein may further include operations, features, means, or instructions for transmitting a first grant in a broadcast control channel scheduling the first broadcast transmission in a first resource, the first grant being scrambled with a group identifier of a group to which the UE belongs, and transmitting a second grant scheduling the unicast transmission in a second resource that occurs within a defined amount of time of the first resource.

Some examples of the method, apparatuses, and non-transitory computer-readable medium described herein may further include operations, features, means, or instructions for receiving a monitoring capability of the UE, and transmitting the control signaling indicating the priority rule based on the monitoring capability.

In some examples of the method, apparatuses, and non-transitory computer-readable medium described herein, the monitoring capability indicates whether the UE may be capable of simultaneously receiving the first broadcast transmission and the unicast transmission within a resource that at least partially overlaps in time.

In some examples of the method, apparatuses, and non-transitory computer-readable medium described herein, the monitoring capability indicates a number of receiver filters, antenna panels, or both, of the UE.

In some examples of the method, apparatuses, and non-transitory computer-readable medium described herein, the monitoring capability indicates a beam switch timing capability of the UE.

DETAILED DESCRIPTION

Figure 1:
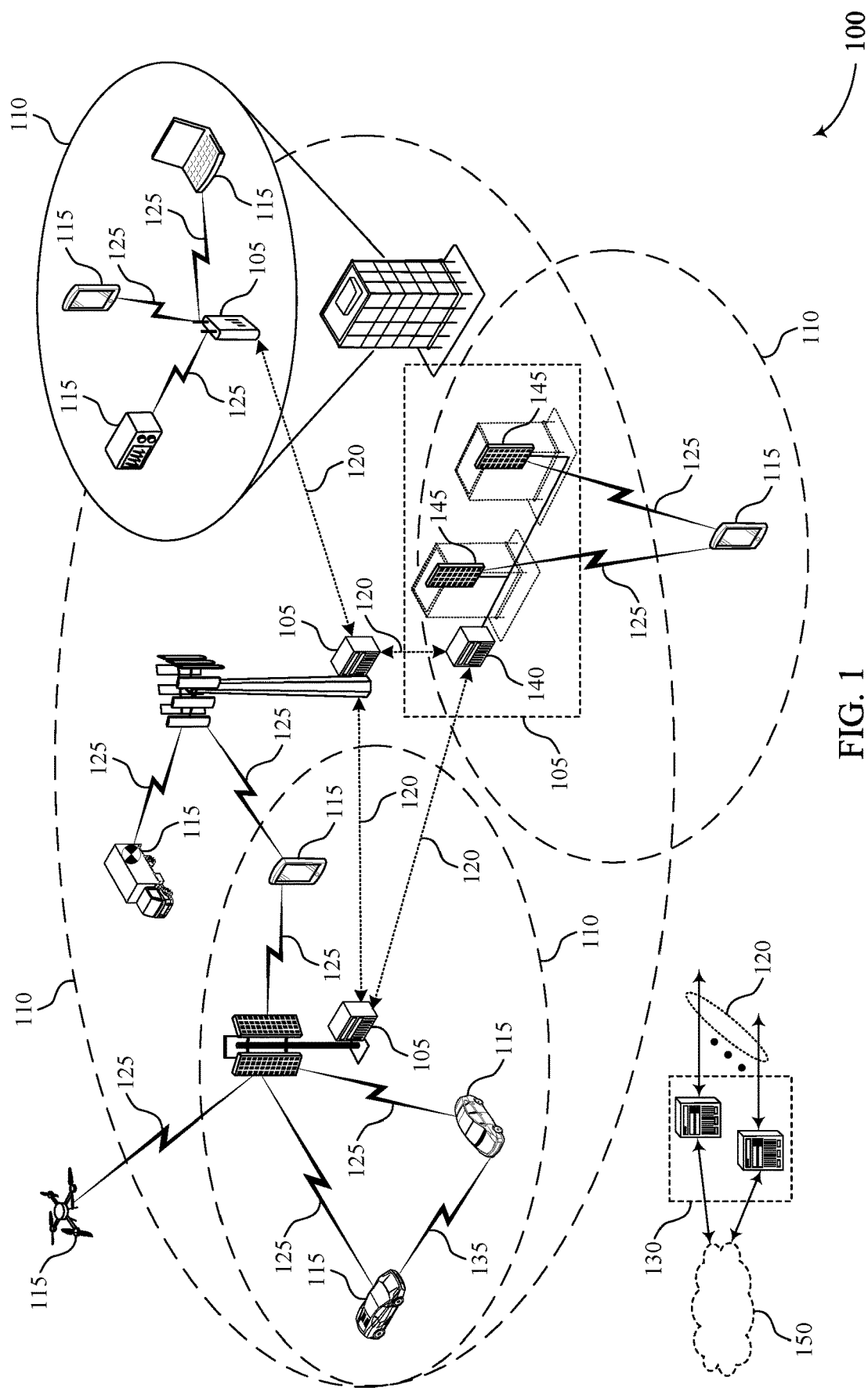
FIG. 1 illustrates an example of a system for wireless communications in accordance with aspects of the present disclosure.

A user equipment (UE) may communicate with one or more base stations. For instance, the UE may use one or more receive beams to receive a transmission from the base station, where the base station may transmit the transmission over one or more transmit beams. Such transmissions may include unicast transmissions, which may be directed to the UE. Additionally or alternatively, such transmissions may include broadcast or groupcast transmissions, which may be directed to multiple UEs. The one or more receive beams that the UE uses to receive a unicast transmission may be different from the one or more receive beams that the UE uses to receive a broadcast or groupcast transmission.

In some cases, the UE may determine a scheduling conflict between a first transmission received on a first beam associated with a unicast transmission and a second transmission received on a second beam associated with a broadcast or groupcast transmission. For instance, at least one of a resource for receiving a broadcast data transmission, a broadcast control resource set (CORESET) monitoring occasion, or one or more reference signals associated with the broadcast CORESET may at least partially overlap with or be on a same resource as a resource for receiving a unicast data transmission, a unicast CORESET monitoring occasion, or one or more reference signals for the unicast CORESET. If the UE has a capability to receive the first transmission and the second transmission simultaneously, the UE may receive the first transmission over the first beam and the second transmission over the second beam without dropping either transmission.

However, there may be instances where the UE is unable to receive both transmissions simultaneously. For instance, the UE may be able to use the first beam or the second beam but not both at a given instance of time and there may be a time delay associated with switching from the first beam to the second beam. In such cases, the UE may benefit from identifying a priority rule for receiving one of the first transmission and the second transmission when a scheduling conflict occurs and dropping the other of the first transmission and the second transmission. The priority rule may specify a priority of a broadcast data transmission, a broadcast CORESET, and/or one or more reference signals associated with the broadcast CORSET relative to a unicast data transmission, a unicast CORESET, and/or one or more reference signals associated with the unicast CORSET. The UE may identify the priority rule by receiving control signaling indicating the priority rule or by retrieving the priority rule from a storage device of the UE.

Aspects of the disclosure are initially described in the context of wireless communications systems. Additional aspects of the disclosure are described in the context of an additional wireless communications system, broadcasting schemes, and a process flow. Aspects of the disclosure are further illustrated by and described with reference to apparatus diagrams, system diagrams, and flowcharts that relate to prioritizing broadcast and unicast transmissions.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port. In some cases, beamforming for mmW systems may be more directional than sub-6 MHz systems.

Beamforming, which may also be referred to as spatial filtering, directional beamforming, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some cases, a UE 115 may receive a PDCCH over a CORESET. A CORESET may be made up of a set of resource blocks, which may in turn be made up of respective sets of resource elements. PDCCH transmissions that schedule PDSCH transmissions may be referred to as downlink grants and PDCCH transmissions that schedule physical uplink shared channel (PUSCH) transmissions may be referred to as uplink grants.

In some cases, a UE 115 may identify a priority rule for selecting to monitor a first beam associated with a first broadcast transmission (e.g., a transmission of broadcast control information) or a second beam that differs from the first beam and is associated with a unicast transmission. The UE 115 may use the priority rule when a scheduling conflict is identified between the first broadcast transmission and the unicast transmission. Such conflicts may include at least one of a broadcast transmission, a control resource set (CORESET) monitoring occasion of the broadcast transmission, or reference signals of the broadcast transmission at least partially overlapping with a unicast transmission, a CORESET monitoring occasion of the unicast transmission, or reference signals associated with the unicast transmission. The UE 115 may monitor, in accordance with the priority rule, one of the first beam or the second beam based on identification of scheduling conflict.

Figure 2:
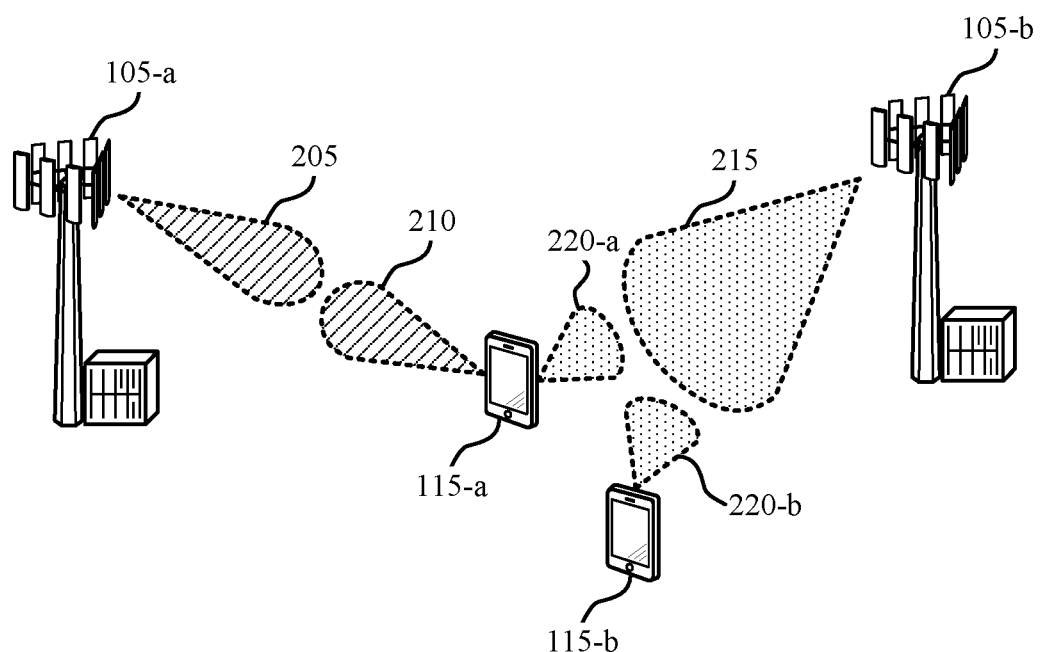
FIG. 2 illustrates an example of a wireless communications system in accordance with aspects of the present disclosure.

FIG. 2 illustrates an example of a wireless communications system 200 in accordance with aspects of the present disclosure. In some examples, wireless communications system 200 may implement aspects of wireless communications system 100. For instance, base stations 105-a and 105-b may be examples of base stations 105 as described with reference to FIG. 1 and UEs 115-a and 115-b may be examples of UEs 115 as described with reference to FIG. 1.

UE 115-a may receive a unicast transmission from base station 105-a. Base station 105-a may transmit the unicast transmission using transmit beam 205 and UE 115-a may receive the unicast transmission using receive beam 210. Likewise, UE 115-a may receive a broadcast transmission from base station 105-b. Base station 105-b may transmit the broadcast transmission using transmit beam 215 and UE 115-a may receive the broadcast transmission using receive beam 220-a. UE 115-b may also receive the broadcast transmission using receive beam 220-b. More details about types of broadcast communications may be described with reference to FIGS. 3A, 3B, and 3C.

In some cases, UE 115-a may use different receive configurations to receive broadcast transmissions versus receiving unicast transmissions. UE 115-a may use different receive beamforming for receiving unicast transmissions versus receiving broadcast transmissions (e.g., receive beam 210 versus receive beam 220-a), as unicast gNB beams (e.g., beam 205) may be different from broadcast gNB beams (e.g., beam 215). For instance, a broadcast gNB beam may be wider and have less beamforming gain than a unicast gNB beam. As such, UE 115-a may use a larger array or have more receive subarrays for forming receive beam 220-a as compared to forming receive beam 210.

Base station 105-a may transmit reference signals to UE 115-a so that UE 115-a may train receive beam 210 and base station 105-b may transmit reference signals to UE 115-a so that UE 115-a may train receive beam 220-a (e.g., to receive a broadcast channel). Multiple transmit and receive pairs may be available for UE 115-a to receive a broadcast transmission (e.g., as described with reference to one or more of FIG. 3A, 3B, or 3C). In such cases, base station 105-b may indicate to UE 115-a which transmit and receive pair to use for a specific broadcast transmission.

In some cases, a transmission associated with a broadcast CORESET or PDCCH may have conflicts with a unicast transmission. For instance, the transmission associated with the broadcast CORESET or PDCCH and the unicast transmission may be scheduled at a same time and/or frequency such that UE 115-a may not receive both using the same beam. Additionally or alternatively, the transmission associated with the broadcast CORESET or PDCCH and the unicast transmission may be scheduled at a nearby time such that UE 115-a may not be capable of switch between beams in time to receive both transmissions (in cases where UE 115-a is not able to perform an early switch).

The transmissions associated with a broadcast CORESET or PDCCH may be transmitted over a transmit beam 215 and may be received over a receive beam 220. One example of a transmission associated with a broadcast CORESET or PDCCH may include a broadcast PDCCH received over a dedicated CORESET, where a broadcast PDCCH transmission may be a PDCCH transmission transmitted over a broadcast transmit beam 215 and/or that schedules a PDSCH transmission over a broadcast transmit beam 215, and where a dedicated CORESET may be a CORESET dedicated for receiving broadcast PDCCH transmissions (i.e., a dedicated broadcast CORESET). Another example of a transmission associated with a broadcast CORESET or PDCCH may be a broadcast PDCCH received over a CORSET that is not dedicated for receiving broadcast PDCCHs (i.e., a non-dedicated CORESET). Such PDCCH transmissions may be scrambled with a group identifier (ID) (e.g., instead of a UE ID).

Still another example of a transmission associated with a broadcast CORESET or PDCCH may be a PDSCH transmission scheduled by a broadcast PDCCH received over a dedicated or non-dedicated CORESET. Yet another example of a transmission associated with a broadcast CORESET or PDCCH may be a reference signal associated with the dedicated broadcast CORESET that UE 115-a may use to detect beam failure.

Unicast transmissions may be transmitted over a transmit beam 205 and may be received over a receive beam 210. One example of a unicast transmission may include a unicast PDCCH received over a dedicated CORSET, where a unicast PDCCH transmission may be a PDCCH transmission transmitted over a unicast transmit beam 205 and/or that schedules a PDSCH transmission over a unicast transmit beam 205, and where a dedicated CORESET may be a CORESET dedicated for receiving unicast PDCCH transmissions (i.e., a dedicated unicast CORESET). Another example of a unicast transmission may be a PDSCH transmission scheduled by a unicast PDCCH received over a dedicated unicast CORESET or over a non-dedicated CORESET. Yet another example of a unicast transmission may be a reference signal associated with the dedicated unicast CORSET.

One example of a conflict may be when a transmission (e.g., a PDSCH transmission) scheduled by a broadcast CORESET PDCCH (e.g., a PDCCH transmission received over a dedicated broadcast CORSET) or a group-ID-scrambled-PDCCH (e.g., a broadcast PDCCH transmission received over a non-dedicated CORSET) conflicts with another transmission, such as one of the unicast transmissions as listed herein. For instance, a resource of a broadcast PDSCH transmission may partially overlap in time and/or frequency with a resource for a unicast transmission or may be on the same resource.

Another example of a conflict may be when a potential broadcast CORESET monitoring occasion (e.g., resources for a dedicated broadcast CORESET) conflicts with a unicast CORESET monitoring occasion (e.g., resources for a dedicated unicast CORESET). In such cases, UE 115-a may monitor certain resources and may do blind decoding for a potential PDSCH in each CORESET. The broadcast CORESET and unicast CORESET may overlap in time, but may be associated with different receive beams. For instance, the unicast CORESET may be used for receiving transmissions on receive beam 210 and the broadcast CORESET may be used for receiving transmissions on receive beam 220.

Yet another example of a conflict may be when reference signals associated with the broadcast CORESET to monitor conflict with a unicast transmission or reference signal monitoring. As described herein, UE 115-a may perform monitoring of references signals associated with CORESETs to detect beam failure. The reference signals for a broadcast CORESET may be located at a same time as another pre-scheduled transmission (e.g., the reference signals for another CORESET). For instance, if the reference signals for a broadcast CORESET are in a fourth symbol of every four slots, and the reference signals for a unicast CORSET are in a fourth symbol of every two slots, then every four slots the reference signals for the broadcast CORESET may overlap with the reference signals for the unicast CORESET. In such cases, UE 115-a may use different receive beams (e.g., receive beam 210 for the unicast CORESET reference signals and receive beam 220 for the broadcast CORESET reference signals).

If UE 115-*a* determines that a conflict is to occur or that a conflict is occurring between a transmission associated with the broadcast CORESET or PDCCH (e.g., broadcast scheduling) and a unicast transmission (e.g., a pre-granted unicast transmission), UE 115-*a* may prioritize or deprioritize one of the two transmissions. Prioritizing may involve receiving both transmissions or receiving one of the two transmissions and dropping the other. In some examples, the broadcast channel may have higher priority and may have more scheduling constraints.

In some cases, UE 115-*a* may prioritize transmissions based on predefined rules and signals. For instance, UE 115-*a* may retrieve a priority rule from a storage device of UE 115-*a*. Additionally or alternatively, UE 115-*a* may receive control signaling from a base station 105 (e.g., base station 105-*a* or base station 105-*b*) that includes a priority rule indicating a priority of CORESETs to UE 115-*a*. For instance, the priority rule may indicate a priority of a first CORESET (e.g., for scheduling a broadcast transmission) relative to a second CORESET (e.g., for scheduling a unicast transmission), that the UE 115-*a* may use to select which beam to monitor when a scheduling conflict is identified.

In some cases, the priority rule may be based on UE capability. For instance, if UE 115-*a* is capable of simultaneously receiving (e.g., and successfully decoding) both transmissions within a resource that at least partially overlaps in time, the priority rule may indicate that UE 115-*a* may receive both transmissions. However, if UE 115-*a* is unable to simultaneously receive (e.g., and successfully decode) both transmissions within the resource, the priority rule may indicate that UE 115-*a* is to prioritize one of the transmissions over the other. Other UE capabilities may include a number of receive filters or panels that UE 115-*a* may use to receive transmissions at a given time and/or how quickly a beam switch may be performed.

To signal a UE capability to the base station 105 (e.g., base station 105-*a* and/or base station 105-*b*) that is determining the priority rule, UE 115-*a* may report, to the base station 105, the number of receive filters or panels of the UE 115 and how quickly the UE 115 may perform a beam switch. The base station 105 may use the UE capability information to determine a priority rule and may transmit the priority rule to UE 115-*a* via control signaling.

In some cases, the base station 105 whose transmission was dropped may retransmit the dropped transmission. One mechanism for performing retransmission may be that the base station 105 may use the received UE capability and the determined priority rule to determine to reschedule the dropped transmission. Another mechanism for performing retransmission may be that UE 115-*a* may transmit feedback (e.g., a NACK) to the base station 105 indicating that one of the broadcast or unicast transmission was dropped. The base station 105, upon receiving the feedback, may retransmit the dropped transmission.

In one example, UE 115-*a* may receive a unicast transmission over receive beam 210 and may receive a transmission associated with a broadcast CORSET or PDCCH over receive beam 220-*a*. If the unicast transmission is prioritized over the transmission associated with the broadcast CORSET or PDCCH, UE 115-*a* may transmit feedback (e.g., a NACK) to base station 105-*b*, which may retransmit the transmission associated with the broadcast CORESET or PDCCH. If the transmission associated with the broadcast CORESET or PDCCH is prioritized over the unicast transmission, UE 115-*a* may transmit feedback (e.g., a NACK) to base station 105-*a*, which may retransmit the unicast transmission.

The methods as described herein may provide several advantages to UE 115-*a*. For instance, if UE 115-*a* is incapable of receiving a unicast transmission and a transmission associated with a broadcast CORESET or PDCCH simultaneously or if UE 115-*a* is incapable of switching fast enough to receive both transmissions, UE 115-*a* may have a mechanism by which it may determine which transmission to receive based on the importance indicated by a priority rule. Additionally, if UE 115-*a* transmits the feedback to the base station 105 whose transmission was dropped, UE 115-*a* may still receive the dropped transmission as a retransmission.

Figure 3A:
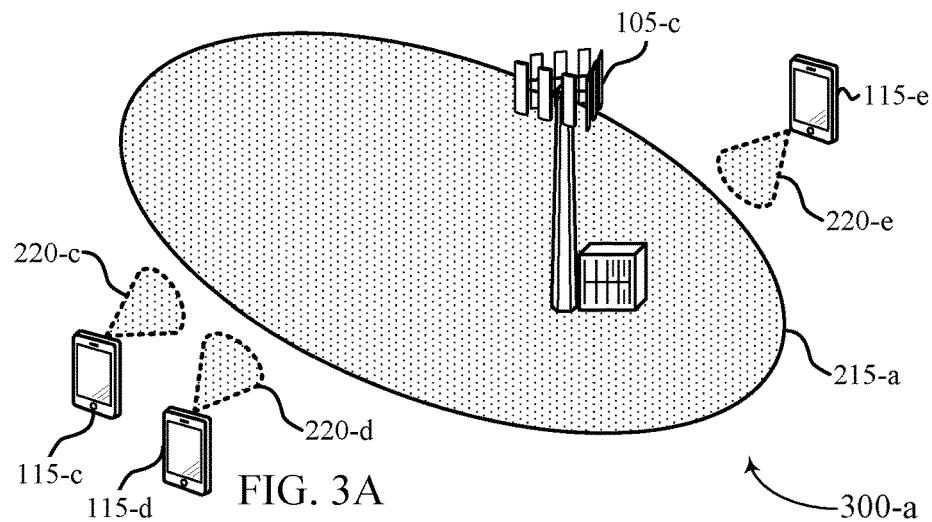
FIGS. 3A, 3B, and 3C illustrate examples of broadcasting schemes in accordance with aspects of the present disclosure.
Figure 3B:
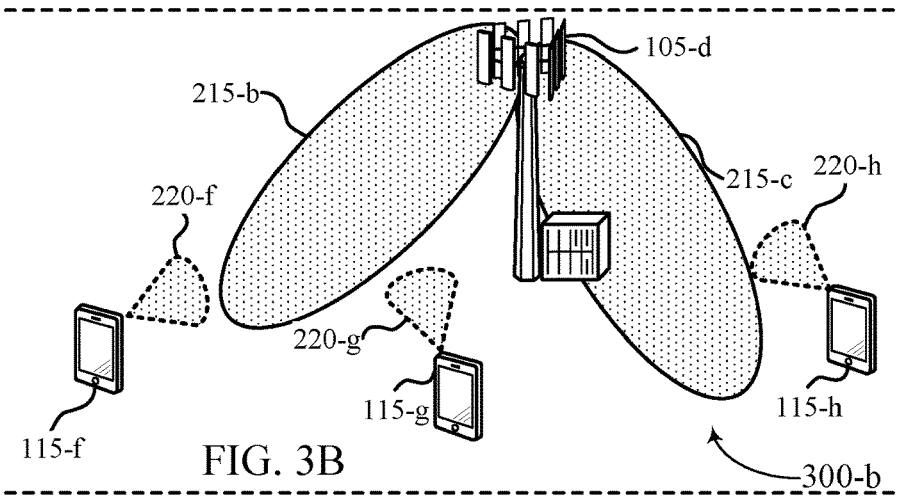
Figure 3C:
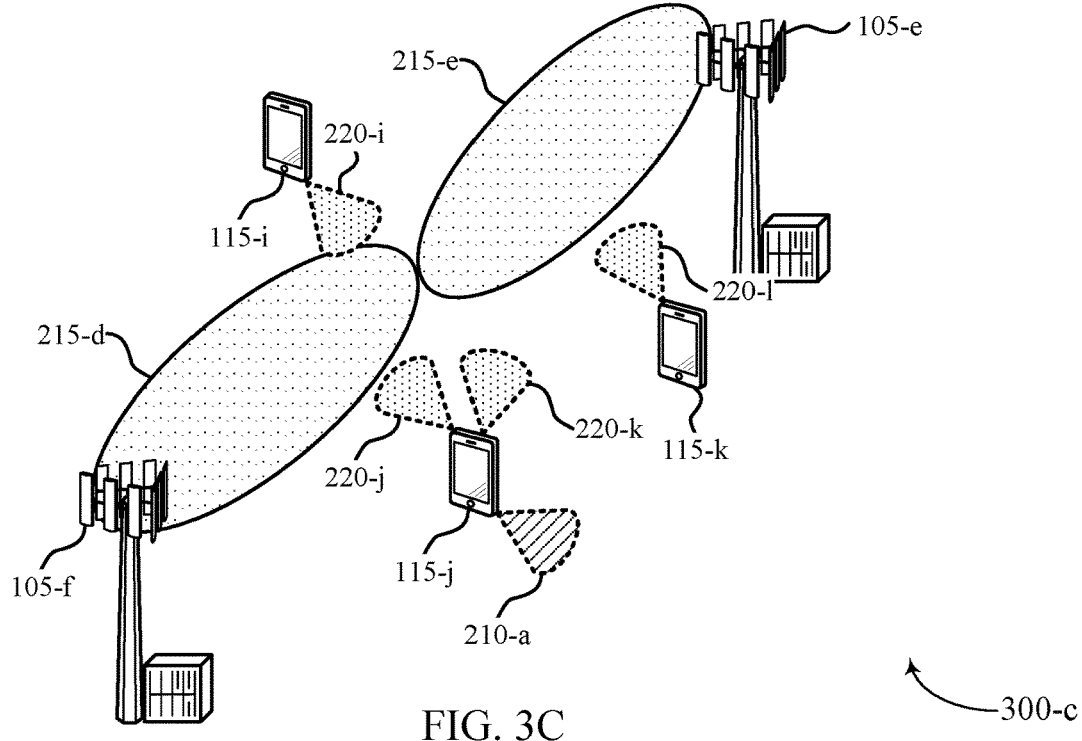

FIGS. 3A, 3B, and 3C illustrate examples of broadcast schemes 300-*a*, 300-*b*, and 300-*c* in accordance with aspects of the present disclosure. In some examples, broadcast schemes 300-*a*, 300-*b*, and 300-*c* may implement aspects of wireless communications system 100. For instance, base stations 105-*c*, 105-*d*, 105-*e*, and 105-*f* may be examples of base stations 105 as described with reference to FIG. 1 and UEs 115-*c*, 115-*d*, 115-*e*, 115-*f*, 115-*g*, 115-*h*, 115-*i*, 115-*j*, and 115-*k* may be examples of UEs 115 as described with reference to FIG. 1.

FIG. 3A may illustrate an example of a first broadcasting scheme 300-*a*. In broadcasting scheme 300-*a*, base station 105-*c* may use beam 215-*a* (e.g., a wide beam) to cover multiple UEs 115 (e.g., 115-*c*, 115-*d*, and 115-*e*) in a broad direction. UEs 115-*c*, 115-*d*, and 115-*e* may receive transmissions associated with a broadcast CORESET or PDCCH over receive beams 220-*c*, 220-*d*, and 220-*e*, respectively.

FIG. 3B may illustrate an example of a second broadcasting scheme 300-*b*. In broadcasting scheme 300-*b*, base station 105-*d* may form a composite beam (e.g., transmit beams 215-*b* and 215-*c*) to broadcast UEs 115 in different directions. For instance, UEs 115-*f* and 115-*g* may receive transmissions associated with a broadcast CORESET or PDCCH from transmit beam 215-*b* over receive beams 220-*f* and 220-*g* and UE 115-*h* may receive transmission associated with a broadcast CORESET or PDCCH from transmit beam 215-*c* over receive beam 220-*h*.

FIG. 3C may illustrate an example of a third broadcasting scheme 300-*c*. In broadcasting scheme 300-*c*, multiple base stations 105-*e* and 105-*f*, which may be transmission reception points (TRPs) or gNBs, may coordinate to broadcast to a group of UEs 115 (e.g., UEs 115-*i*, 115-*j*, and 115-*k*). For instance, UE 115-*i* may receive transmissions associated with a broadcast CORESET or PDCCH from transmit beam 215-*d* and UE 115-*k* may receive transmission associated with a broadcast CORESET or PDCCH from transmit beam 215-*e* over receive beam 220-*l*. UE 115-*j* may receive transmission associated with a broadcast CORESET or PDCCH from transmit beam 215-*d* over receive beam 220-*j* and/or transmit beam 215-*e* over receive beam 220-*k*. Additionally UE 115-*j* may have a receive beam 210-*a* for receiving unicast transmissions.

Figure 4:
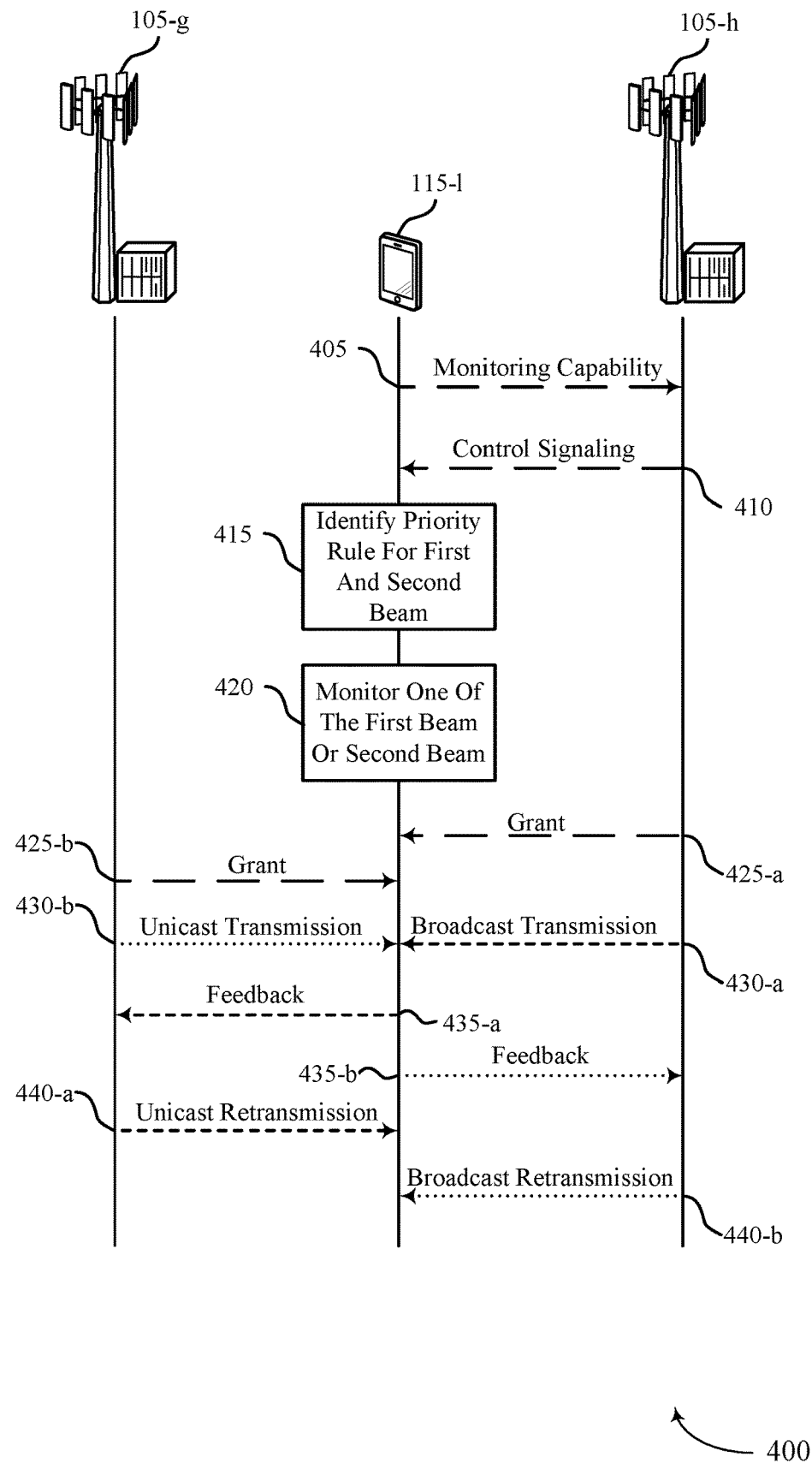
FIG. 4 illustrates an example of a process flow in accordance with aspects of the present disclosure.

FIG. 4 illustrates an example of a process flow 400 in accordance with aspects of the present disclosure. In some examples, process flow 400 may be implemented by aspects of wireless communications system 100. For instance, base stations 105-*g* and 105-*h* may be examples of base stations 105 as described with reference to FIG. 1 and UE 115-*l* may be an example of a UE 115 as described with reference to FIG. 1.

At 405, UE 115-*l* may transmit a monitoring capability of UE 115-*l*. Base station 105-*h* may receive the monitoring capability. The monitoring capability may indicate whether UE 115-*l* is capable of simultaneously receiving the first broadcast transmission and the unicast transmission within a resource that at least partially overlaps in time. Additionally or alternatively, a number of receiver filters, antenna panels, or both, of UE 115-*l*. Additionally or alternatively, the monitoring capability may indicate a beam switch timing capability of UE 115-*l*. In some cases, UE 115-*l* may be preconfigured with the priority rule, and optionally may not transmit the monitoring capability to base station 105-*h*.

At 410, base station 105-*h* may transmit control signaling indicating a priority rule for selecting to monitor a first beam associated with a first broadcast transmission (e.g., a transmission of broadcast control information), or a second beam that differs from the first beam and is associated with a unicast transmission, when a scheduling conflict is identified between the first broadcast transmission and the unicast transmission. In some cases, the priority rule may specify a priority of a broadcast control resource set associated with the first broadcast transmission relative to a second control resource set associated with the unicast transmission. In some cases, transmitting the control signaling may be based on base station 105-*h* receiving the monitoring capability at 405. UE 115-*l* may receive the control signaling. In some cases, the control signaling may be transmitted by base station 105-*g*. In such cases, the monitoring capability may be transmitted to base station 105-*g* at 405. In some cases, the control signaling may be transmitted by another base station 105. In such cases, the control monitoring capability be transmitted to the other base station 105 at 405. In some cases, UE 115-*l* may be preconfigured with the priority rule, and the base station 105-*h* optionally may not transmit the control signaling indicating the priority rule.

At 415, UE 115-*l* may identify the priority rule. The priority rule may be identified based on receiving the control signaling at 410 and/or may be identified based on retrieving the priority rule from a storage device of UE 115-*l*. In some cases, the priority rule may be inferred. For example, the priority rule may be associated with a particular status, operating mode, or one or more other circumstances of UE 115-*l* and inferred therefrom.

Identifying the scheduling conflict may be based on a first monitoring occasion resource for a broadcast control resource set at least partially overlapping with a second monitoring occasion resource associated with the unicast transmission. In such cases, identifying the scheduling conflict may be based on a blind decoding candidate within the first monitoring occasion resource at least partially overlapping with the second monitoring occasion resource. Additionally or alternatively, identifying the scheduling conflict may be based on UE 115-*l* being configured to use the first beam to monitor the first monitoring occasion resource and being configured to use the second beam to monitor the second monitoring occasion resource. In some cases, identifying the scheduling conflict may be based on the first broadcast transmission being one or more reference signals of a broadcast control resource set that at least partially overlaps with a resource of the unicast transmission. Additionally or alternatively, the scheduling conflict may be based on the first broadcast transmission being one or more first reference signals of a broadcast control resource set that at least partially overlap with one or more second reference signals of the unicast transmission.

At 420, UE 115-*l* may monitor, in accordance with the priority rule, one of the first beam or the second beam based on identification of the scheduling conflict, such as described herein. In some cases, monitoring may involve monitoring, using the first beam, a broadcast control resource set for the first broadcast transmission that is a PDCCH transmission. In such cases, the broadcast control resource set may be a configured dedicated broadcast control resource set. In some cases, determining whether to monitor the first beam or the second beam in accordance with the priority rule may involve determining whether the unicast transmission or the first broadcast transmission have a higher priority and to monitor the first beam if the first broadcast transmission has the higher priority and may monitor the second beam if the unicast transmission has the higher priority. If monitoring the first beam, UE 115-*l* may refrain from monitoring the second beam and, if monitoring the second beam, UE 115-*l* may refrain from monitoring the first beam.

At 425-*a*, base station 105-*h* may transmit a grant in a broadcast control resource set scheduling the first broadcast transmission that is a data transmission in a first resource. In some cases, the grant transmitted at 425-*a* may be transmitted in a broadcast control channel scheduling the first broadcast transmission in the first resource and may be scrambled with a group identifier of a group to which UE 115-*l* belongs. At 425-*b*, base station 105-*g* may transmit a grant in a second resource that occurs within a defined amount of time of the first resource. The first resource and the second resource may at least partially overlap in time, frequency, or both. Additionally or alternatively, the first resource and the second resource may be the same resource.

If UE 115-*l* determines to monitor the first beam in accordance with the priority rule, 430-*a*, 435-*a*, and 440-*a* may occur. In such cases, UE 115-*l* may drop the unicast transmission regardless of whether base station 105-*g* transmits the unicast transmission, as UE 115-*l* may not be monitoring the second beam. At 430-*a*, base station 105-*h* may transmit a first broadcast transmission. UE 115-*l* may receive the first broadcast transmission using the first beam based on the priority rule indicating to select to monitor the first broadcast transmission. At 435-*a*, UE 115-*l* may transmit feedback indicating that UE 115-*l* did not receive and successfully decode the unicast transmission (e.g., a NACK). UE 115-*l* may transmit the feedback due to dropping the unicast transmission. Base station 105-*g* may receive the feedback. At 440-*a*, base station 105-*g* may transmit a retransmission of the unicast transmission based on receiving the feedback. UE 115-*l* may receive the retransmission of the unicast transmission.

If UE 115-*l* determines to monitor the second beam in accordance with the priority rule, 430-*b*, 435-*b*, and 440-*b* may occur. In such cases, UE 115-*l* may drop the first broadcast transmission regardless of whether base station 105-*h* transmits the first broadcast transmission, as UE 115-*l* may not be monitoring the first beam. At 430-*b*, base station 105-*g* may transmit a unicast transmission using the second beam. UE 115-*l* may receive the unicast transmission based on the priority rule indicating to select to monitor the unicast transmission. At 435-*b*, UE 115-*l* may transmit feedback to base station 105-*h* indicating that UE 115-*l* did not receive and successfully decode a first broadcast transmission (e.g., a NACK). UE 115-*l* may transmit the feedback due to dropping the first broadcast transmission. Base station 105-*h* may receive the feedback. Base station 105-*h* may transmit a retransmission of the first broadcast transmission based on receiving the feedback. UE 115-*l* may receive the retransmission of the unicast transmission.

In some cases, a single base station 105 may perform the functions performed by base stations 105-*g* and 105-*h*. For instance, a single base station 105 may perform any combination of 410, 425-*a*, 425-*b*, 430-*a*, 430-*b*, 440-*a*, and 440-*b*. In such cases, UE 115-*l* may transmit feedback at 435-*a* and/or 435-*b* to a same base station 105 from which a broadcast transmission and/or unicast transmission at 430-*a* and/or 430-*b*, respectively, was received.

Figure 5:
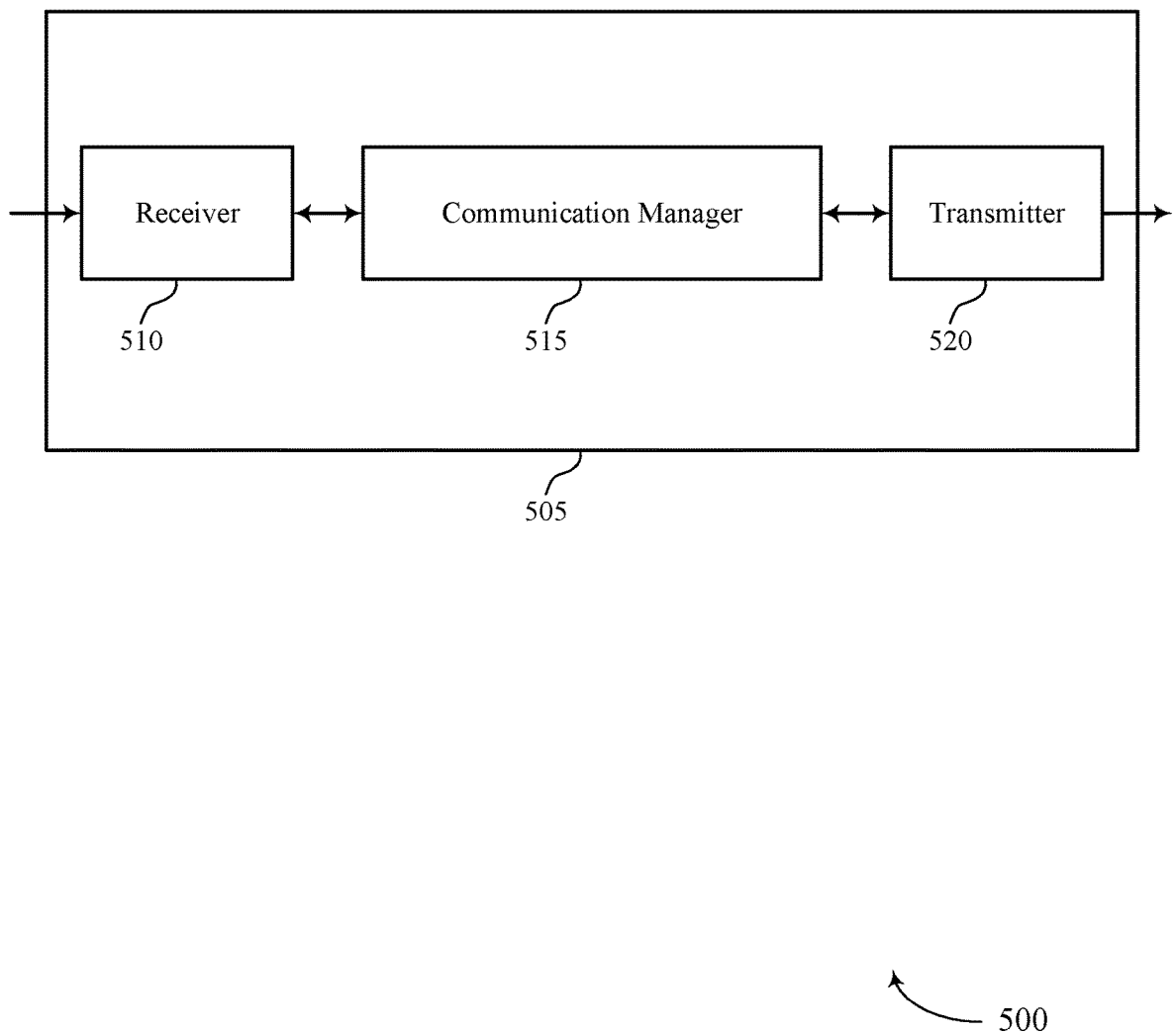
FIGS. 5 and 6 show block diagrams of devices in accordance with aspects of the present disclosure.

FIG. 5 shows a block diagram 500 of a device 505 in accordance with aspects of the present disclosure. The device 505 may be an example of aspects of a UE 115 as described herein. The device 505 may include a receiver 510, a communication manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to prioritizing broadcast and unicast transmissions, etc.). Information may be passed on to other components of the device 505. The receiver 510 may be an example of aspects of the transceiver 815 described with reference to FIG. 8. The receiver 510 may utilize a single antenna or a set of antennas.

The communication manager 515 may identify a priority rule for selecting to monitor a first beam associated with a first broadcast transmission, or a second beam that differs from the first beam and is associated with a unicast transmission, when a scheduling conflict is identified between the first broadcast transmission and the unicast transmission and monitor, in accordance with the priority rule, one of the first beam or the second beam based on identification of the scheduling conflict. The communication manager 515 may be an example of aspects of the communication manager 810 described herein.

In some examples, the communication manager 515 monitoring the first beam or the second beam in accordance with the identified priority rule may have one or more advantages. For instance, the priority rule may enable the communication manager 515 to select between transmissions when a UE associated with the communication manager 515 is unable to perform switching between beams fast enough to receive each transmission.

The communication manager 515, or its sub-components, may be implemented in hardware, code (e.g., software or firmware) executed by a processor, or any combination thereof. If implemented in code executed by a processor, the functions of the communication manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 515, or its sub-components, may be physically located at various positions, including being distributed such that portions of functions are implemented at different physical locations by one or more physical components. In some examples, the communication manager 515, or its sub-components, may be a separate and distinct component in accordance with various aspects of the present disclosure. In some examples, the communication manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 815 described with reference to FIG. 8. The transmitter 520 may utilize a single antenna or a set of antennas.

Figure 6:
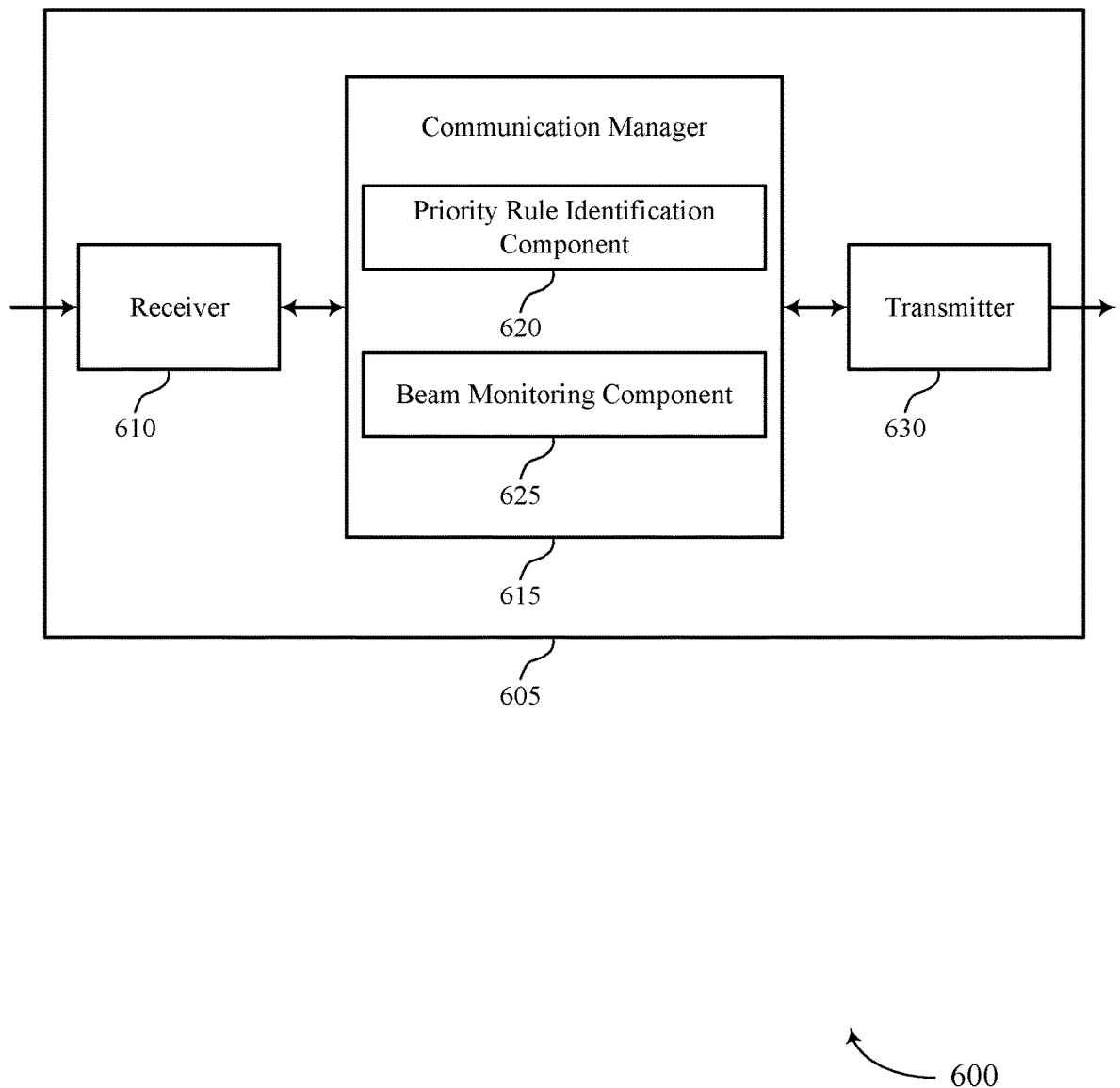

FIG. 6 shows a block diagram 600 of a device 605 in accordance with aspects of the present disclosure. The device 605 may be an example of aspects of a device 505, or a UE 115 as described herein. The device 605 may include a receiver 610, a communication manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to prioritizing broadcast and unicast transmissions, etc.). Information may be passed on to other components of the device 605. The receiver 610 may be an example of aspects of the transceiver 815 described with reference to FIG. 8. The receiver 610 may utilize a single antenna or a set of antennas.

The communication manager 615 may be an example of aspects of the communication manager 515 as described herein. The communication manager 615 may include a priority rule identification component 620 and a beam monitoring component 625. The communication manager 615 may be an example of aspects of the communication manager 810 described herein.

The priority rule identification component 620 may identify a priority rule for selecting to monitor a first beam associated with a first broadcast transmission, or a second beam that differs from the first beam and is associated with a unicast transmission, when a scheduling conflict is identified between the first broadcast transmission and the unicast transmission.

The beam monitoring component 625 may monitor, in accordance with the priority rule, one of the first beam or the second beam based on identification of the scheduling conflict.

In some examples, the beam monitoring component 625 monitoring the first beam or the second beam in accordance with the identified priority rule may have one or more advantages. For instance, the priority rule may enable the beam monitoring component 625 to select between transmissions when a UE associated with the beam monitoring component 625 is unable to perform switching between beams fast enough to receive each transmission.

The transmitter 630 may transmit signals generated by other components of the device 605. In some examples, the transmitter 630 may be collocated with a receiver 610 in a transceiver module. For example, the transmitter 630 may be an example of aspects of the transceiver 815 described with reference to FIG. 8. The transmitter 630 may utilize a single antenna or a set of antennas.

Figure 7:
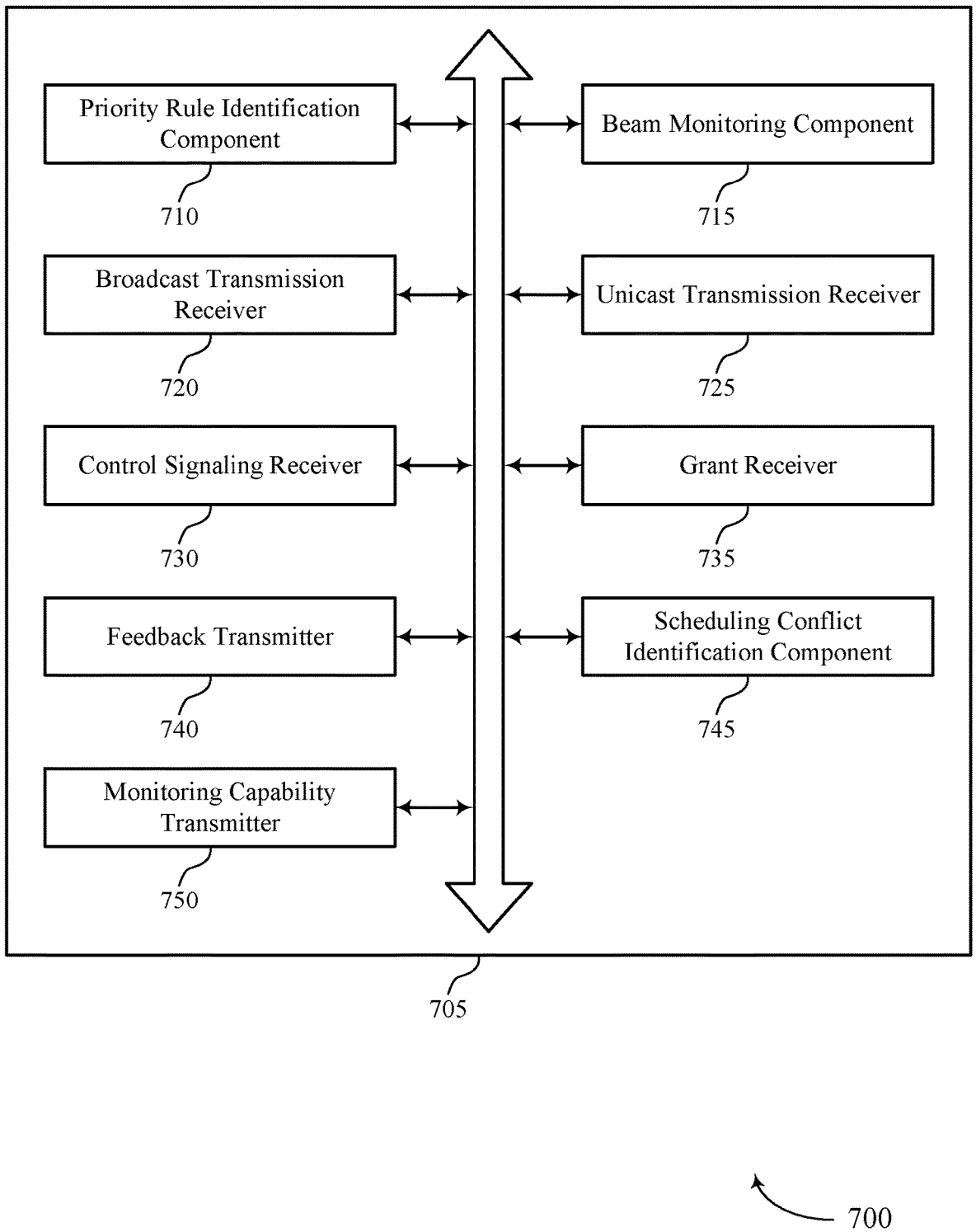
FIG. 7 shows a block diagram of a communication manager in accordance with aspects of the present disclosure.

FIG. 7 shows a block diagram 700 of a communication manager 705 in accordance with aspects of the present disclosure. The communication manager 705 may be an example of aspects of a communication manager 515, a communication manager 615, or a communication manager 810 described herein. The communication manager 705 may include a priority rule identification component 710, a beam monitoring component 715, a broadcast transmission receiver 720, an unicast transmission receiver 725, a control signaling receiver 730, a grant receiver 735, a feedback transmitter 740, a scheduling conflict identification component 745, and a monitoring capability transmitter 750. Each of these modules may communicate, directly or indirectly, with one another (e.g., via one or more buses).

The priority rule identification component 710 may identify a priority rule for selecting to monitor a first beam associated with a first broadcast transmission, or a second beam that differs from the first beam and is associated with a unicast transmission, when a scheduling conflict is identified between the first broadcast transmission and the unicast transmission. In some examples, the priority rule identification component 710 may retrieve the priority rule from a storage device of the UE.

The beam monitoring component 715 may monitor, in accordance with the priority rule, one of the first beam or the second beam based on identification of the scheduling conflict. In some examples, the beam monitoring component 715 may monitor, using the first beam, a broadcast control resource set for the first broadcast transmission that is a physical downlink control channel transmission.

In some examples, the beam monitoring component 715 monitoring the first beam or the second beam in accordance with the identified priority rule may have one or more advantages. For instance, the priority rule may enable the beam monitoring component 715 to select between transmissions when a UE associated with the beam monitoring component 715 is unable to perform switching between beams fast enough to receive each transmission.

The broadcast transmission receiver 720 may receive the first broadcast transmission using the first beam based on the priority rule indicating to select to monitor the first broadcast transmission. In some examples, the broadcast transmission receiver 720 may receive a retransmission of the first broadcast transmission of the broadcast control information from the base station based on transmitting the feedback.

The unicast transmission receiver 725 may receive the unicast transmission using the second beam based on the priority rule indicating to select to monitor the unicast transmission. In some examples, the unicast transmission receiver 725 may receive a retransmission of the unicast transmission from the base station based on transmitting the feedback.

The control signaling receiver 730 may receive control signaling indicating the priority rule. In some examples, the control signaling receiver 730 may receive the control signaling indicating the priority rule that specifies a priority of a broadcast control resource set associated with the first broadcast transmission relative to a second control resource set associated with the unicast transmission. In some examples, the control signaling receiver 730 may receive control signaling indicating the priority rule based on the monitoring capability.

The grant receiver 735 may receive a first grant in a broadcast control resource set scheduling the first broadcast transmission that is a data transmission in a first resource. In some examples, the grant receiver 735 may receive a second grant scheduling the unicast transmission in a second resource that occurs within a defined amount of time of the first resource. In some examples, the grant receiver 735 may receive a first grant in a broadcast control channel scheduling the first broadcast transmission in a first resource, the first grant being scrambled with a group identifier of a group to which the UE belongs. In some examples, the grant receiver 735 may receive a second grant scheduling the unicast transmission in a second resource that occurs within a defined amount of time of the first resource.

The feedback transmitter 740 may transmit feedback to a base station indicating that the UE did not receive and successfully decode the unicast transmission. In some examples, the feedback transmitter 740 may transmit feedback to a base station indicating that the UE did not receive and successfully decode the first broadcast transmission of the broadcast control information.

The scheduling conflict identification component 745 may identify the scheduling conflict based on a first monitoring occasion resource for a broadcast control resource set at least partially overlapping with a second monitoring occasion resource associated with the unicast transmission. In some examples, the scheduling conflict identification component 745 may identify the scheduling conflict based on a blind decoding candidate within the first monitoring occasion resource at least partially overlapping with the second monitoring occasion resource. In some examples, the scheduling conflict identification component 745 may identify the scheduling conflict based on the UE being configured to use the first beam to monitor the first monitoring occasion resource and being configured to use the second beam to monitor the second monitoring occasion resource. In some examples, the scheduling conflict identification component 745 may identify the scheduling conflict based on the first broadcast transmission being one or more reference signals of a broadcast control resource set that at least partially overlap with a resource of the unicast transmission. In some examples, the scheduling conflict identification component 745 may identify the scheduling conflict based on the first broadcast transmission being one or more first reference signals of a broadcast control resource set that at least partially overlap with one or more second reference signals of the unicast transmission.

The monitoring capability transmitter 750 may transmit a monitoring capability of the UE.

Figure 8:
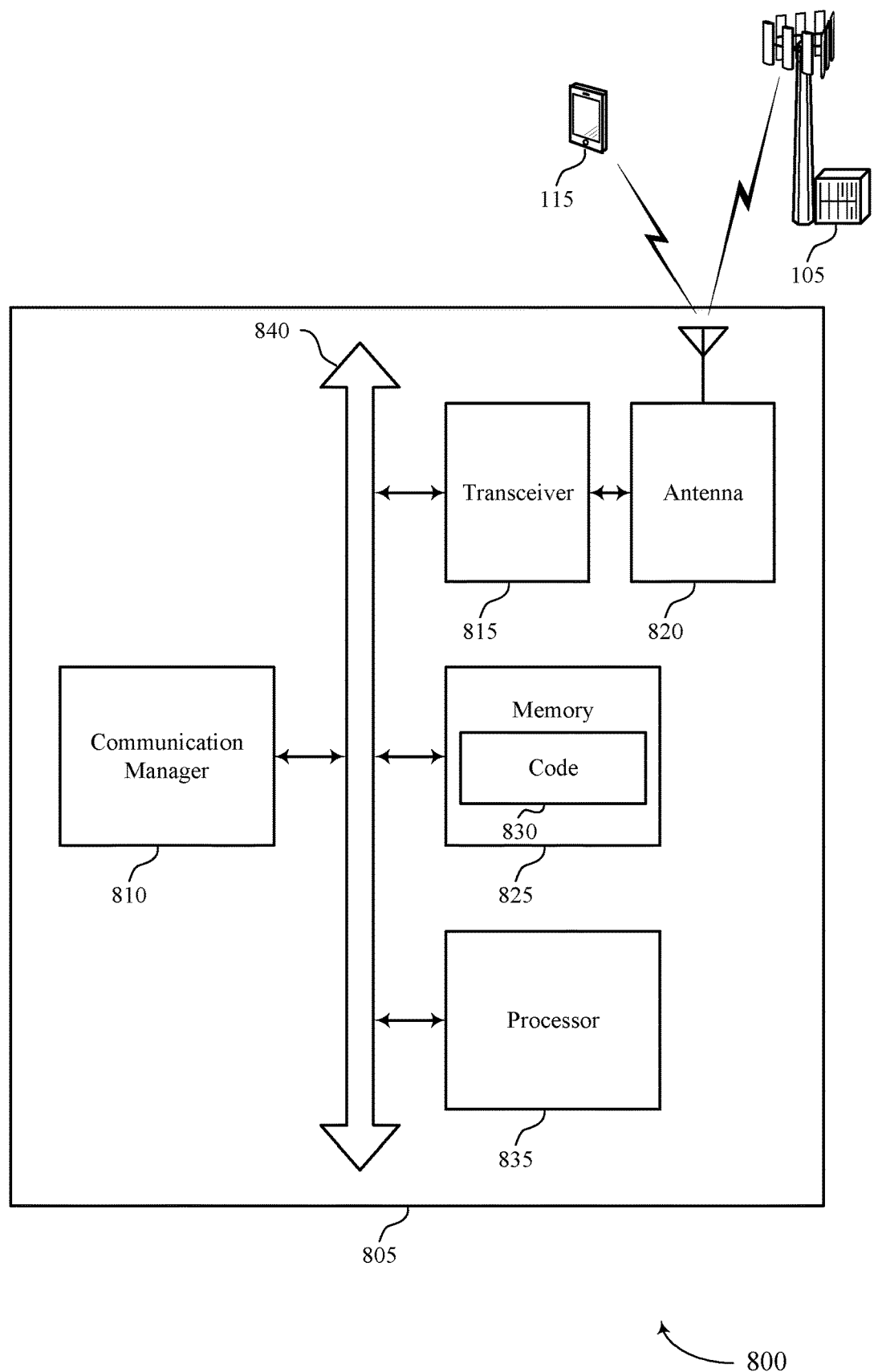
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of device 505, device 605, or a UE 115 as described herein. The device 805 may include components for bi-directional voice and data communications including components for transmitting and receiving communications, including a communication manager 810, a transceiver 815, an antenna 820, memory 825, and a processor 835. These components may be in electronic communication via one or more buses (e.g., bus 840).

The communication manager 810 may identify a priority rule for selecting to monitor a first beam associated with a first broadcast transmission, or a second beam that differs from the first beam and is associated with a unicast transmission, when a scheduling conflict is identified between the first broadcast transmission and the unicast transmission and monitor, in accordance with the priority rule, one of the first beam or the second beam based on identification of the scheduling conflict.

In some examples, the communication manager 810 monitoring the first beam or the second beam in accordance with the identified priority rule may have one or more advantages. For instance, the priority rule may enable the communication manager 810 to select between transmissions when a UE associated with the communication manager 810 is unable to perform switching between beams fast enough to receive each transmission.

The transceiver 815 may communicate bi-directionally, via one or more antennas, wired, or wireless links as described above. For example, the transceiver 815 may represent a wireless transceiver and may communicate bi-directionally with another wireless transceiver. The transceiver 815 may also include a modem to modulate the packets and provide the modulated packets to the antennas for transmission, and to demodulate packets received from the antennas.

In some cases, the wireless device may include a single antenna 820. However, in some cases the device may have more than one antenna 820, which may be capable of concurrently transmitting or receiving multiple wireless transmissions.

The memory 825 may include random-access memory (RAM) and read-only memory (ROM). The memory 825 may store computer-readable, computer-executable code 830 including instructions that, when executed, cause the processor to perform various functions described herein. In some cases, the memory 825 may contain, among other things, a basic input/output system (BIOS) which may control basic hardware or software operation such as the interaction with peripheral components or devices.

The code 830 may include instructions to implement aspects of the present disclosure, including instructions to support wireless communications. The code 830 may be stored in a non-transitory computer-readable medium such as system memory or other type of memory. In some cases, the code 830 may not be directly executable by the processor 835 but may cause a computer (e.g., when compiled and executed) to perform functions described herein.

The processor 835 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 835 may be configured to operate a memory array using a memory controller. In other cases, a memory controller may be integrated into the processor 835. The processor 835 may be configured to execute computer-readable instructions stored in a memory (e.g., the memory 825) to cause the device 805 to perform various functions (e.g., functions or tasks supporting prioritizing broadcast and unicast transmissions).

Figure 9:
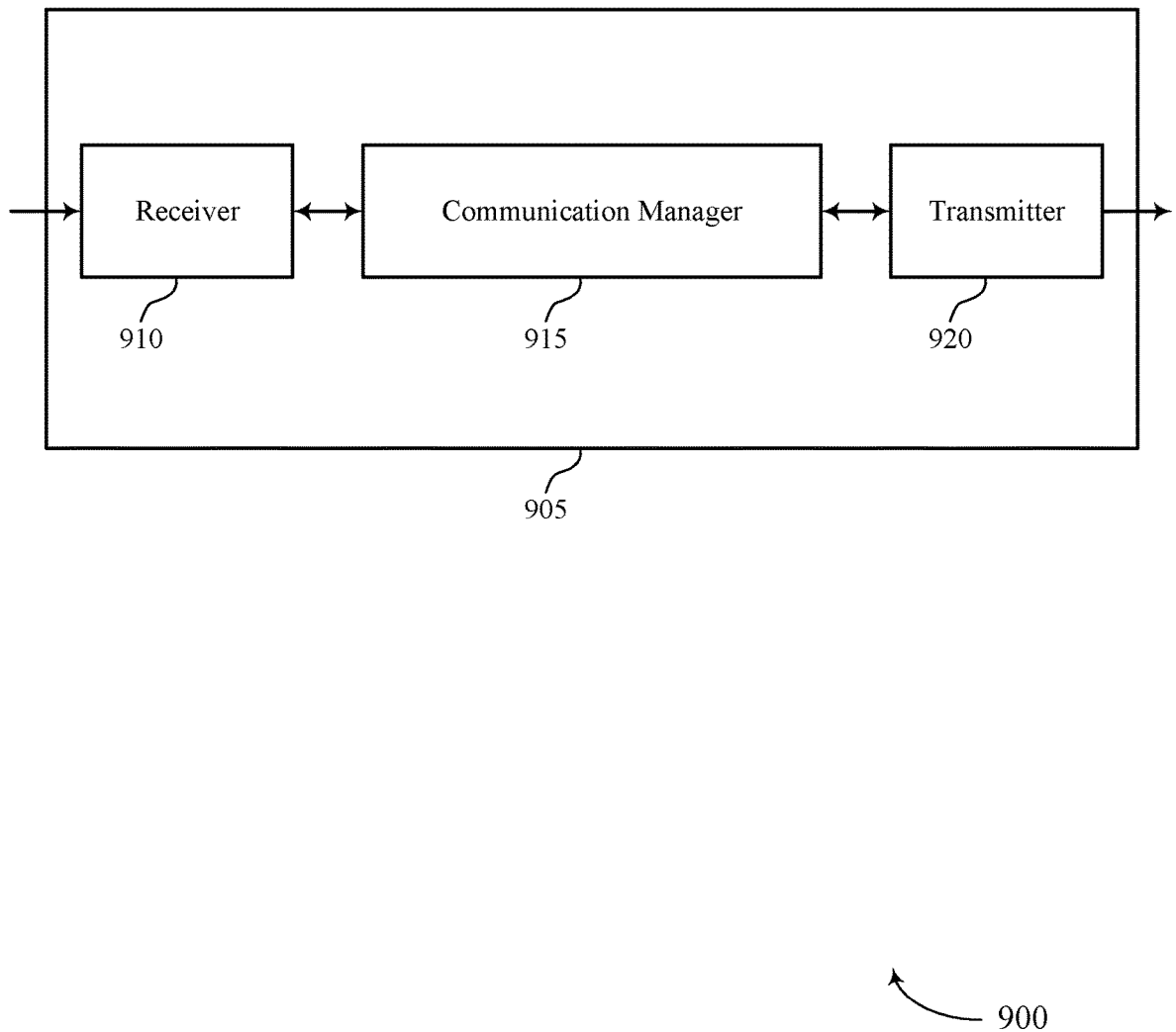
FIGS. 9 and 10 show block diagrams of devices in accordance with aspects of the present disclosure.

FIG. 9 shows a block diagram 900 of a device 905 in accordance with aspects of the present disclosure. The device 905 may be an example of aspects of a base station 105 as described herein. The device 905 may include a receiver 910, a communication manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to prioritizing broadcast and unicast transmissions, etc.). Information may be passed on to other components of the device 905. The receiver 910 may be an example of aspects of the transceiver 1220 described with reference to FIG. 12. The receiver 910 may utilize a single antenna or a set of antennas.

The communication manager 915 may transmit control signaling indicating a priority rule for a UE to apply for selecting to monitor a first beam associated with a first broadcast transmission, or a second beam that differs from the first beam and is associated with a unicast transmission, when a scheduling conflict is identified between the first broadcast transmission and the unicast transmission and transmit the first broadcast transmission using the first beam and the unicast transmission using the second beam. The communication manager 915 may be an example of aspects of the communication manager 1210 described herein.

In some examples, the communication manager 915 transmitting control signaling indicating the priority rule may have one or more advantages. For instance, the priority rule may enable a UE to select between transmissions when the UE is unable to perform switching between beams fast enough to receive each transmission from the communication manager 915.

The communication manager 915, or its sub-components, may be implemented in hardware, code (e.g., software or firmware) executed by a processor, or any combination thereof. If implemented in code executed by a processor, the functions of the communication manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 915, or its sub-components, may be physically located at various positions, including being distributed such that portions of functions are implemented at different physical locations by one or more physical components. In some examples, the communication manager 915, or its sub-components, may be a separate and distinct component in accordance with various aspects of the present disclosure. In some examples, the communication manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
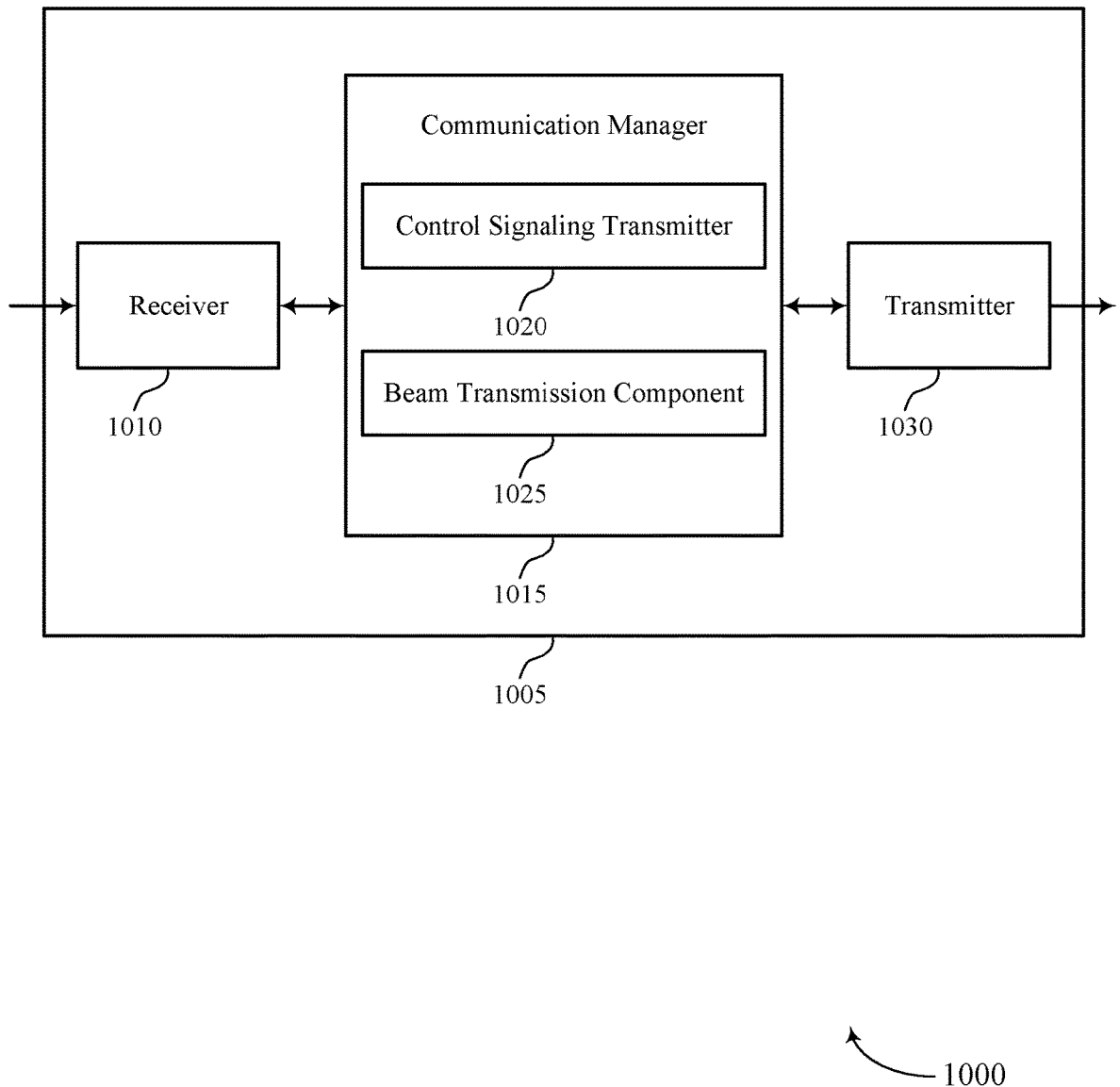

FIG. 10 shows a block diagram 1000 of a device 1005 in accordance with aspects of the present disclosure. The device 1005 may be an example of aspects of a device 905, or a base station 105 as described herein. The device 1005 may include a receiver 1010, a communication manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to prioritizing broadcast and unicast transmissions, etc.). Information may be passed on to other components of the device 1005. The receiver 1010 may be an example of aspects of the transceiver 1220 described with reference to FIG. 12. The receiver 1010 may utilize a single antenna or a set of antennas.

The communication manager 1015 may be an example of aspects of the communication manager 915 as described herein. The communication manager 1015 may include a control signaling transmitter 1020 and a beam transmission component 1025. The communication manager 1015 may be an example of aspects of the communication manager 1210 described herein.

The control signaling transmitter 1020 may transmit control signaling indicating a priority rule for a UE to apply for selecting to monitor a first beam associated with a first broadcast transmission, or a second beam that differs from the first beam and is associated with a unicast transmission, when a scheduling conflict is identified between the first broadcast transmission and the unicast transmission.

The beam transmission component 1025 may transmit the first broadcast transmission using the first beam and the unicast transmission using the second beam.

In some examples, the control signaling transmitter 1020 transmitting control signaling indicating the priority rule may have one or more advantages. For instance, the priority rule may enable a UE to select between transmissions when the UE is unable to perform switching between beams fast enough to receive each transmission from the beam transmission component 1025.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
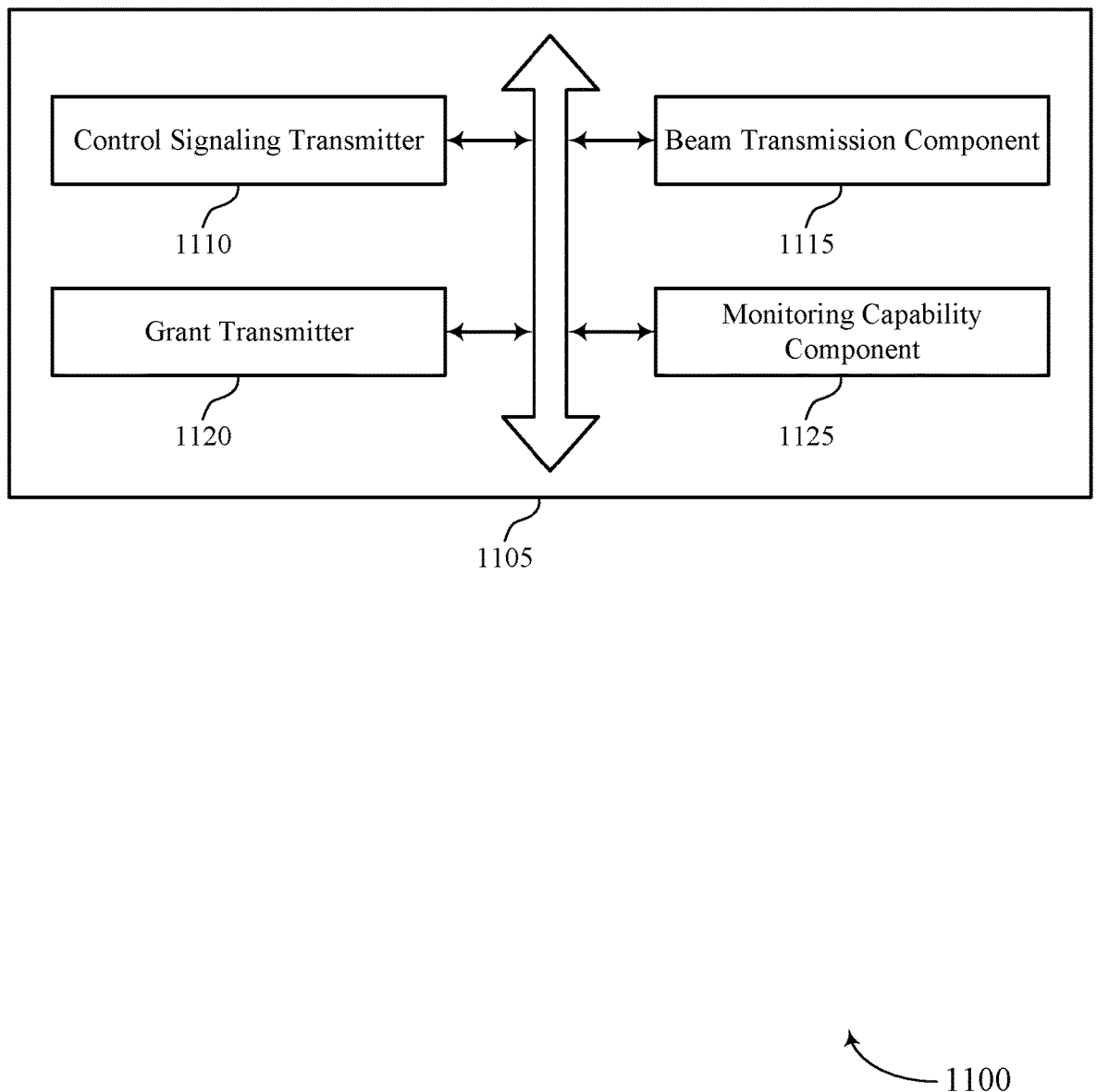
FIG. 11 shows a block diagram of a communication manager in accordance with aspects of the present disclosure.

FIG. 11 shows a block diagram 1100 of a communication manager 1105 in accordance with aspects of the present disclosure. The communication manager 1105 may be an example of aspects of a communication manager 915, a communication manager 1015, or a communication manager 1210 described herein. The communication manager 1105 may include a control signaling transmitter 1110, a beam transmission component 1115, a grant transmitter 1120, and a monitoring capability component 1125. Each of these modules may communicate, directly or indirectly, with one another (e.g., via one or more buses).

The control signaling transmitter 1110 may transmit control signaling indicating a priority rule for a UE to apply for selecting to monitor a first beam associated with a first broadcast transmission, or a second beam that differs from the first beam and is associated with a unicast transmission, when a scheduling conflict is identified between the first broadcast transmission and the unicast transmission. In some examples, the control signaling transmitter 1110 may transmit the control signaling indicating the priority rule that specifies a priority of a broadcast control resource set associated with the first broadcast transmission relative to a second control resource set associated with the unicast transmission. In some examples, the control signaling transmitter 1110 may transmit the control signaling indicating the priority rule based on the monitoring capability.

The beam transmission component 1115 may transmit the first broadcast transmission using the first beam and the unicast transmission using the second beam. In some examples, the beam transmission component 1115 may transmit a physical downlink control channel transmission within a broadcast control resource set.

In some examples, the control signaling transmitter 1110 transmitting control signaling indicating the priority rule may have one or more advantages. For instance, the priority rule may enable a UE to select between transmissions when the UE is unable to perform switching between beams fast enough to receive each transmission from the beam transmission component 1115.

The grant transmitter 1120 may transmit a first grant in a broadcast control resource set scheduling the first broadcast transmission that is a data transmission in a first resource. In some examples, the grant transmitter 1120 may transmit a second grant scheduling the unicast transmission in a second resource that occurs within a defined amount of time of the first resource. In some examples, the grant transmitter 1120 may transmit a first grant in a broadcast control channel scheduling the first broadcast transmission in a first resource, the first grant being scrambled with a group identifier of a group to which the UE belongs. In some examples, the grant transmitter 1120 may transmit a second grant scheduling the unicast transmission in a second resource that occurs within a defined amount of time of the first resource.

The monitoring capability component 1125 may receive a monitoring capability of the UE.

Figure 12:
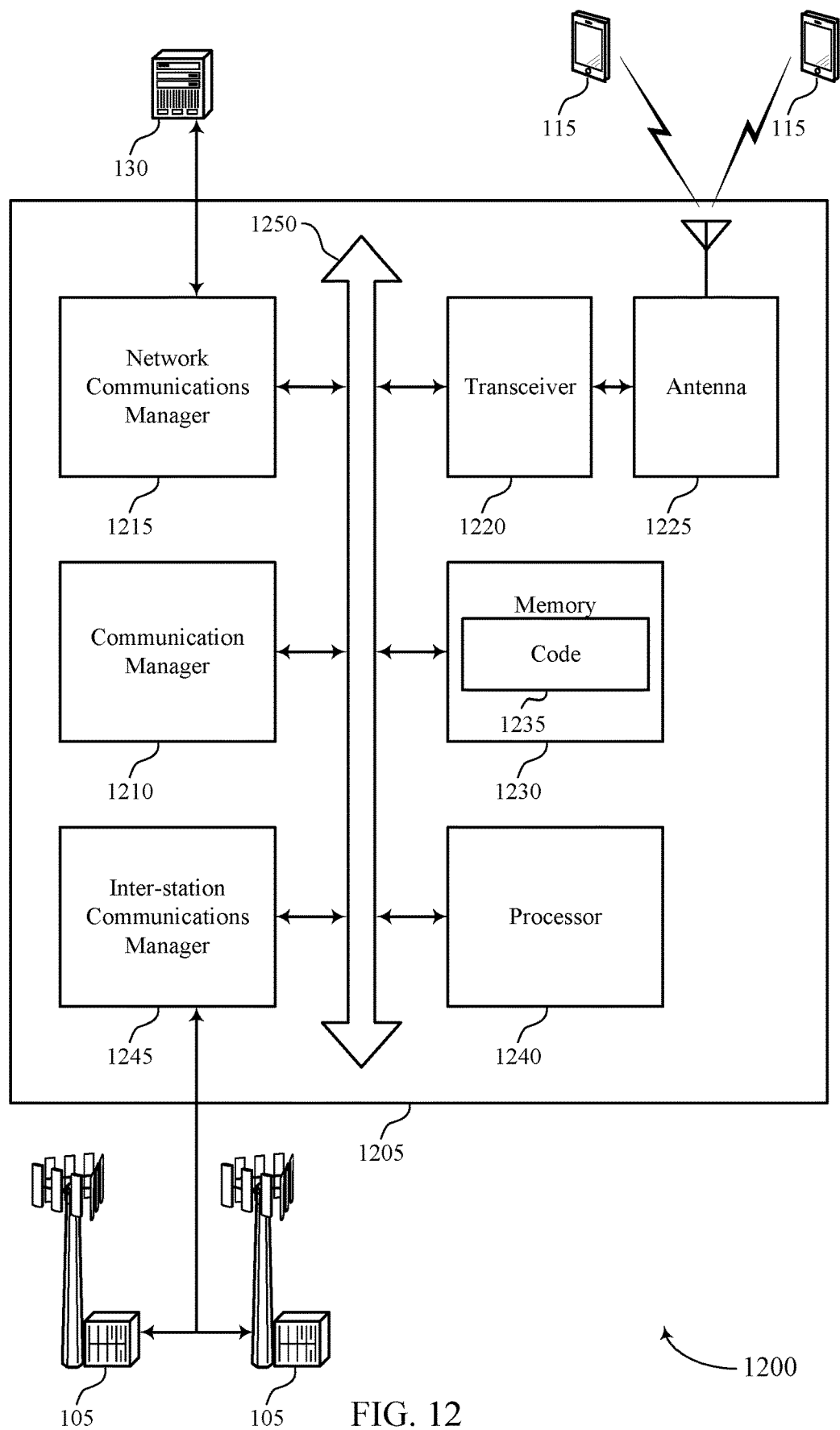
FIG. 12 shows a diagram of a system including a device in accordance with aspects of the present disclosure.

FIG. 12 shows a diagram of a system 1200 including a device 1205 in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communication manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communication manager 1210 may transmit control signaling indicating a priority rule for a UE to apply for selecting to monitor a first beam associated with a first broadcast transmission, or a second beam that differs from the first beam and is associated with a unicast transmission, when a scheduling conflict is identified between the first broadcast transmission and the unicast transmission and transmit the first broadcast transmission using the first beam and the unicast transmission using the second beam.

In some examples, the communication manager 1210 transmitting control signaling indicating the priority rule may have one or more advantages. For instance, the priority rule may enable a UE to select between transmissions when the UE is unable to perform switching between beams fast enough to receive each transmission from the communication manager 1210.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting prioritizing broadcast and unicast transmissions).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

Figure 13:
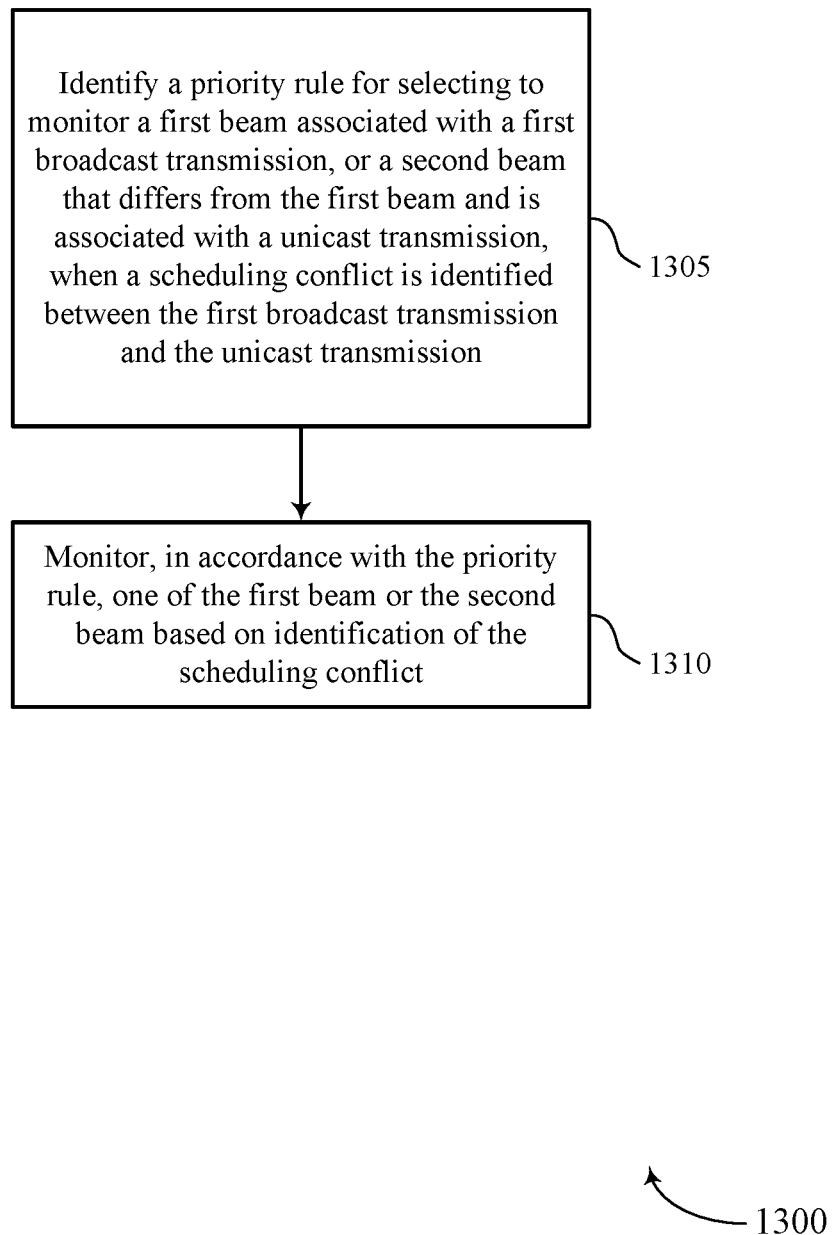
FIGS. 13 through 17 show flowcharts illustrating methods in accordance with aspects of the present disclosure.

FIG. 13 shows a flowchart illustrating a method 1300 in accordance with aspects of the present disclosure. The operations of method 1300 may be implemented by a UE 115 or its components as described herein. For example, the operations of method 1300 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1305, the UE may identify a priority rule for selecting to monitor a first beam associated with a first broadcast transmission, or a second beam that differs from the first beam and is associated with a unicast transmission, when a scheduling conflict is identified between the first broadcast transmission and the unicast transmission. The operations of 1305 may be performed according to the methods described herein. In some examples, aspects of the operations of 1305 may be performed by a priority rule identification component as described with reference to FIGS. 5 through 8.

At 1310, the UE may monitor, in accordance with the priority rule, one of the first beam or the second beam based on identification of the scheduling conflict. The operations of 1310 may be performed according to the methods described herein. In some examples, aspects of the operations of 1310 may be performed by a beam monitoring component as described with reference to FIGS. 5 through 8.

Figure 14:
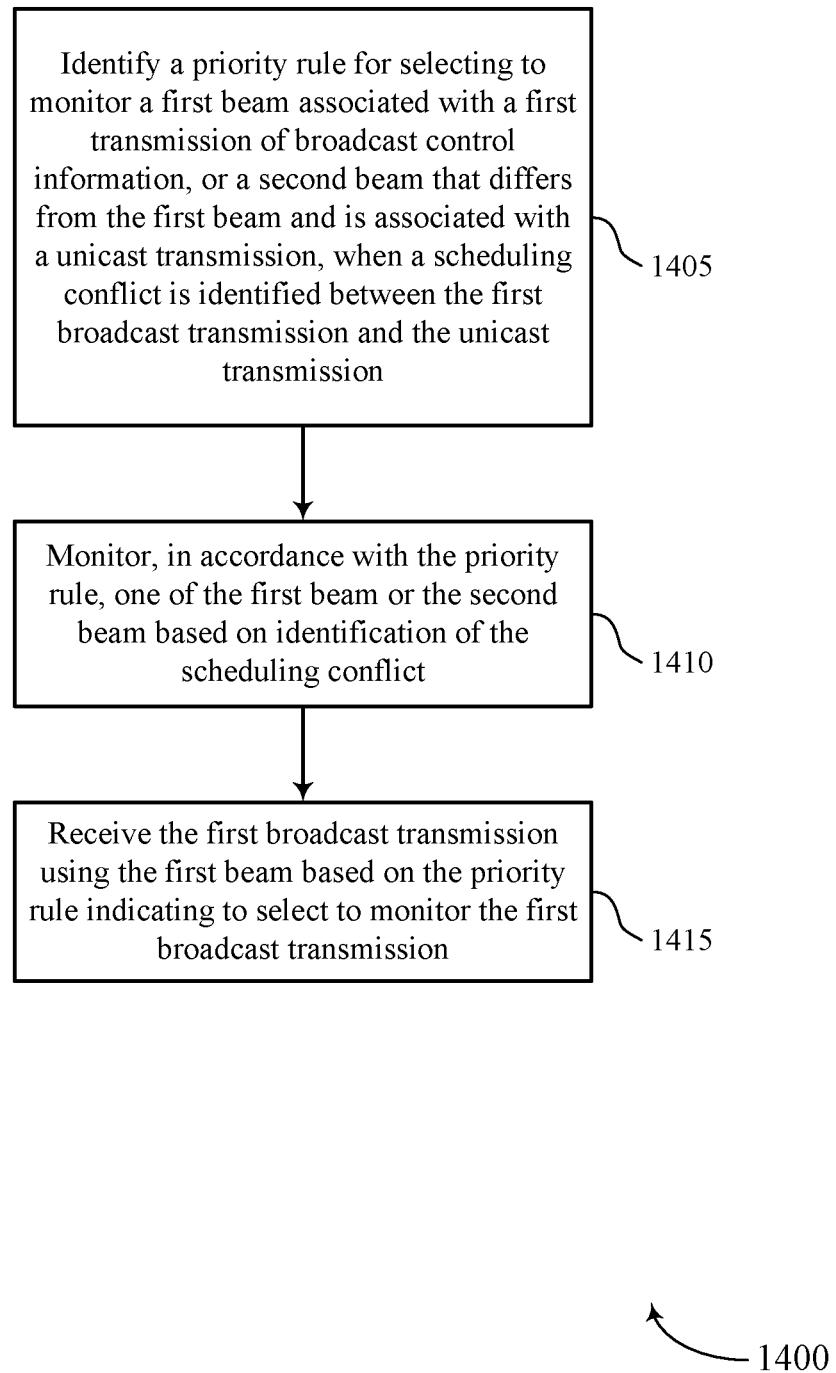

FIG. 14 shows a flowchart illustrating a method 1400 in accordance with aspects of the present disclosure. The operations of method 1400 may be implemented by a UE 115 or its components as described herein. For example, the operations of method 1400 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1405, the UE may identify a priority rule for selecting to monitor a first beam associated with a first broadcast transmission, or a second beam that differs from the first beam and is associated with a unicast transmission, when a scheduling conflict is identified between the first broadcast transmission and the unicast transmission. The operations of 1405 may be performed according to the methods described herein. In some examples, aspects of the operations of 1405 may be performed by a priority rule identification component as described with reference to FIGS. 5 through 8.

At 1410, the UE may monitor, in accordance with the priority rule, one of the first beam or the second beam based on identification of the scheduling conflict. The operations of 1410 may be performed according to the methods described herein. In some examples, aspects of the operations of 1410 may be performed by a beam monitoring component as described with reference to FIGS. 5 through 8.

At 1415, the UE may receive the first broadcast transmission using the first beam based on the priority rule indicating to select to monitor the first broadcast transmission. The operations of 1415 may be performed according to the methods described herein. In some examples, aspects of the operations of 1415 may be performed by a broadcast transmission receiver as described with reference to FIGS. 5 through 8.

Figure 15:
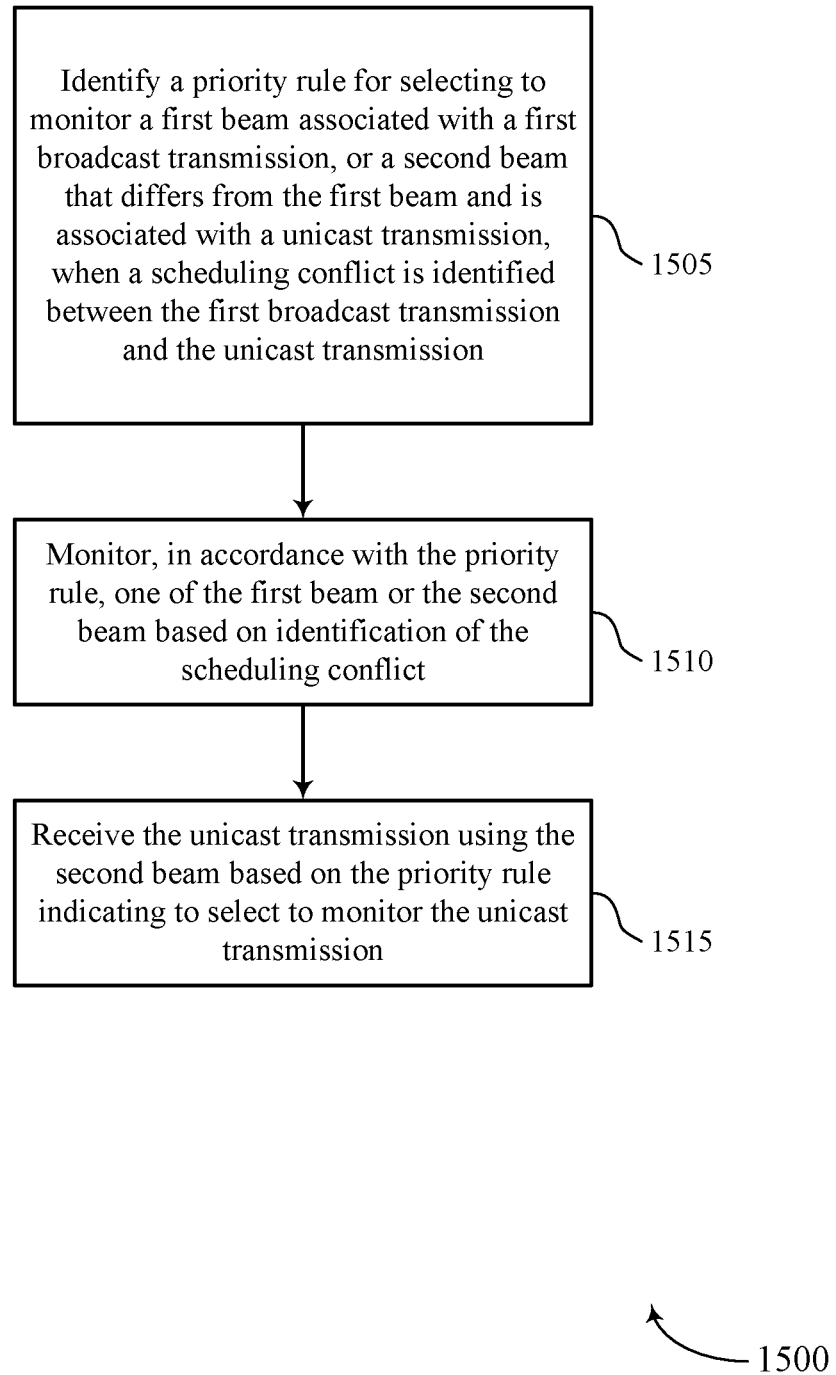

FIG. 15 shows a flowchart illustrating a method 1500 in accordance with aspects of the present disclosure. The operations of method 1500 may be implemented by a UE 115 or its components as described herein. For example, the operations of method 1500 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1505, the UE may identify a priority rule for selecting to monitor a first beam associated with a first broadcast transmission, or a second beam that differs from the first beam and is associated with a unicast transmission, when a scheduling conflict is identified between the first broadcast transmission and the unicast transmission. The operations of 1505 may be performed according to the methods described herein. In some examples, aspects of the operations of 1505 may be performed by a priority rule identification component as described with reference to FIGS. 5 through 8.

At 1510, the UE may monitor, in accordance with the priority rule, one of the first beam or the second beam based on identification of the scheduling conflict. The operations of 1510 may be performed according to the methods described herein. In some examples, aspects of the operations of 1510 may be performed by a beam monitoring component as described with reference to FIGS. 5 through 8.

At 1515, the UE may receive the unicast transmission using the second beam based on the priority rule indicating to select to monitor the unicast transmission. The operations of 1515 may be performed according to the methods described herein. In some examples, aspects of the operations of 1515 may be performed by an unicast transmission receiver as described with reference to FIGS. 5 through 8.

Figure 16:
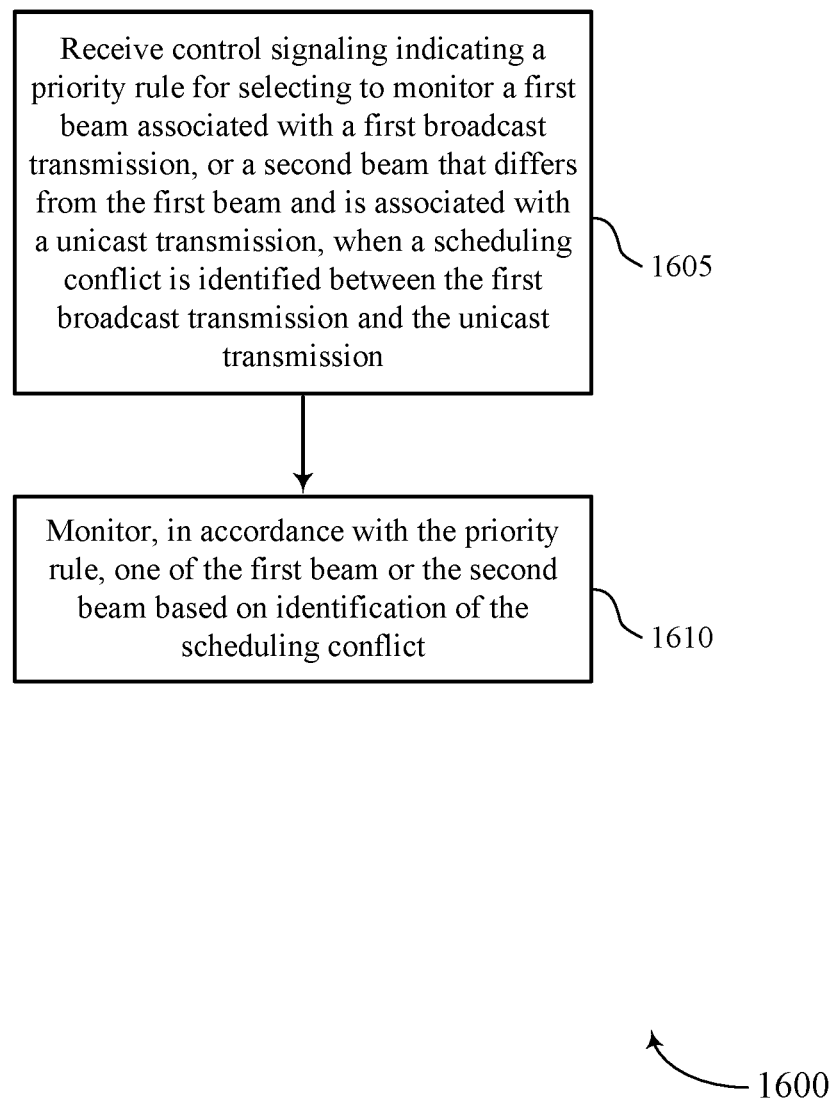

FIG. 16 shows a flowchart illustrating a method 1600 in accordance with aspects of the present disclosure. The operations of method 1600 may be implemented by a UE 115 or its components as described herein. For example, the operations of method 1600 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1605, the UE may receive control signaling indicating a priority rule for selecting to monitor a first beam associated with a first broadcast transmission, or a second beam that differs from the first beam and is associated with a unicast transmission, when a scheduling conflict is identified between the first broadcast transmission and the unicast transmission. The operations of 1605 may be performed according to the methods described herein. In some examples, aspects of the operations of 1605 may be performed by a control signaling receiver as described with reference to FIGS. 5 through 8.

At 1610, the UE may monitor, in accordance with the priority rule, one of the first beam or the second beam based on identification of the scheduling conflict. The operations of 1610 may be performed according to the methods described herein. In some examples, aspects of the operations of 1610 may be performed by a beam monitoring component as described with reference to FIGS. 5 through 8.

Figure 17:
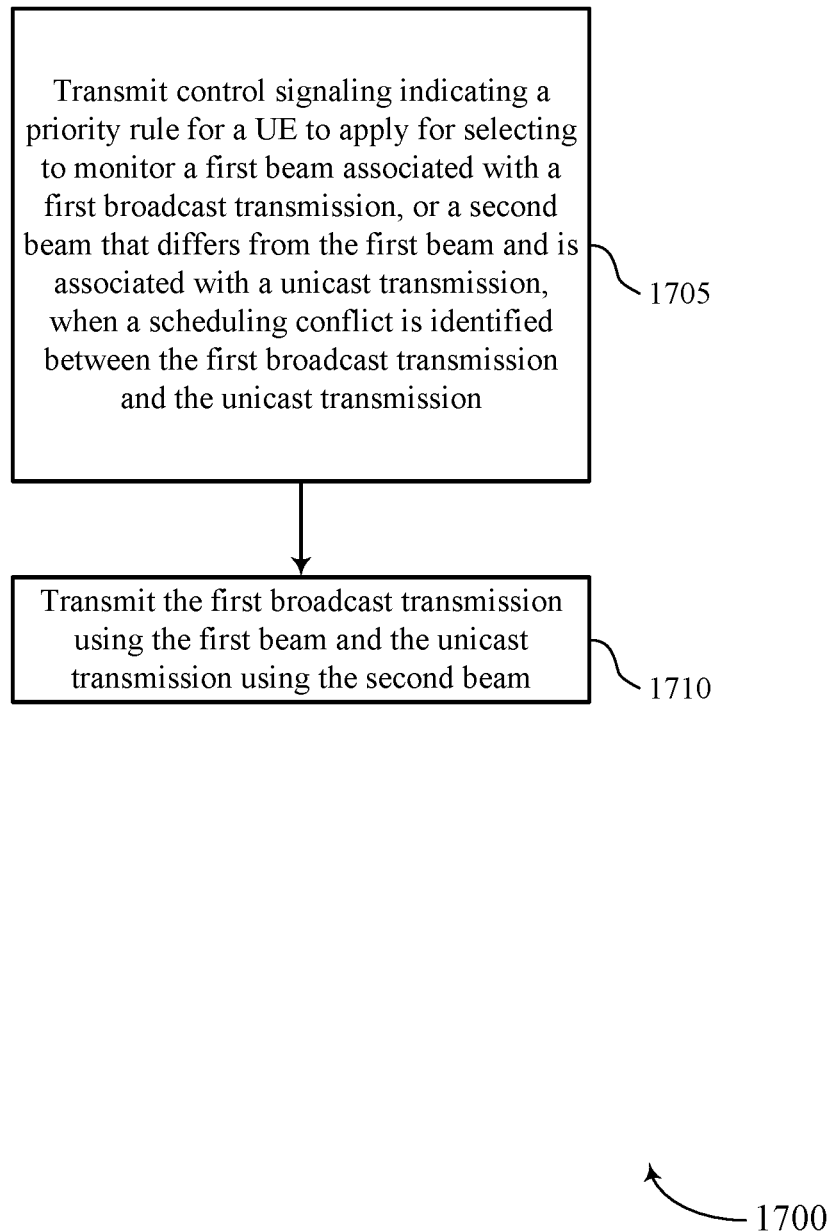

FIG. 17 shows a flowchart illustrating a method 1700 in accordance with aspects of the present disclosure. The operations of method 1700 may be implemented by a base station 105 or its components as described herein. For example, the operations of method 1700 may be performed by a communication manager as described with reference to FIGS. 9 through 12. In some examples, a base station may execute a set of instructions to control the functional elements of the base station to perform the described functions. Additionally or alternatively, a base station may perform aspects of the described functions using special-purpose hardware.

At 1705, the base station may transmit control signaling indicating a priority rule for a UE to apply for selecting to monitor a first beam associated with a first broadcast transmission, or a second beam that differs from the first beam and is associated with a unicast transmission, when a scheduling conflict is identified between the first broadcast transmission and the unicast transmission. The operations of 1705 may be performed according to the methods described herein. In some examples, aspects of the operations of 1705 may be performed by a control signaling transmitter as described with reference to FIGS. 9 through 12.

At 1710, the base station may transmit the first broadcast transmission using the first beam and the unicast transmission using the second beam. The operations of 1710 may be performed according to the methods described herein. In some examples, aspects of the operations of 1710 may be performed by a beam transmission component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
   receiving control signaling indicating a priority rule for selecting to monitor a first beam associated with a first broadcast transmission, or a second beam that differs from the first beam and is associated with a unicast transmission, when a scheduling conflict is identified between the first broadcast transmission and the unicast transmission, wherein the priority rule specifies a priority of a broadcast control resource set associated with the first broadcast transmission relative to a second control resource set associated with the unicast transmission; and
   monitoring, in accordance with the priority rule, one of the first beam or the second beam based at least in part on identification of the scheduling conflict.

2. The method of claim 1, further comprising:
   receiving the first broadcast transmission using the first beam based at least in part on the priority rule indicating to select to monitor the first broadcast transmission.

3. The method of claim 1, further comprising:
   receiving the unicast transmission using the second beam based at least in part on the priority rule indicating to select to monitor the unicast transmission.

4. The method of claim 1, wherein monitoring one of the first beam or the second beam comprises:
   monitor, using the first beam, the broadcast control resource set for the first broadcast transmission that is a physical downlink control channel transmission.

5. The method of claim 4, wherein the broadcast control resource set is a configured dedicated broadcast control resource set.

6. The method of claim 1, further comprising:
   receiving a first grant in the broadcast control resource set scheduling the first broadcast transmission that is a data transmission in a first resource; and
   receiving a second grant scheduling the unicast transmission in a second resource that occurs within a defined amount of time of the first resource.

7. The method of claim 6, wherein the UE monitors the first beam, and further comprising:
   transmitting feedback to a base station indicating that the UE did not receive and successfully decode the unicast transmission; and
   receiving a retransmission of the unicast transmission from the base station based at least in part on transmitting the feedback.

8. The method of claim 6, wherein the UE monitors the second beam, and further comprising:
   transmitting feedback to a base station indicating that the UE did not receive and successfully decode the first broadcast transmission; and
   receiving a retransmission of the first broadcast transmission from the base station based at least in part on transmitting the feedback.

9. The method of claim 6, wherein the first resource and the second resource at least partially overlap in time, frequency, or both.

10. The method of claim 6, wherein the first resource and the second resource are the same resource.

11. The method of claim 1, further comprising:
    receiving a first grant in a broadcast control channel scheduling the first broadcast transmission in a first resource, the first grant being scrambled with a group identifier of a group to which the UE belongs; and receiving a second grant scheduling the unicast transmission in a second resource that occurs within a defined amount of time of the first resource.

12. The method of claim 1, further comprising:
identifying the scheduling conflict based at least in part on a first monitoring occasion resource for the broadcast control resource set at least partially overlapping with a second monitoring occasion resource associated with the unicast transmission.

13. The method of claim 12, wherein identifying the scheduling conflict comprises:
identifying the scheduling conflict based at least in part on a blind decoding candidate within the first monitoring occasion resource at least partially overlapping with the second monitoring occasion resource.

14. The method of claim 12, wherein identifying the scheduling conflict comprises:
identifying the scheduling conflict based at least in part on the UE being configured to use the first beam to monitor the first monitoring occasion resource and being configured to use the second beam to monitor the second monitoring occasion resource.

15. The method of claim 1, further comprising:
identifying the scheduling conflict based at least in part on the first broadcast transmission being one or more reference signals of the broadcast control resource set that at least partially overlap with a resource of the unicast transmission.

16. The method of claim 1, wherein identifying the scheduling conflict comprises:
identifying the scheduling conflict based at least in part on the first broadcast transmission being one or more first reference signals of the broadcast control resource set that at least partially overlap with one or more second reference signals of the unicast transmission.

17. The method of claim 1, further comprising:
transmitting a monitoring capability of the UE,
wherein the control signaling indicating the priority rule is received based at least in part on the monitoring capability.

18. The method of claim 17, wherein the monitoring capability indicates whether the UE is capable of simultaneously receiving the first broadcast transmission and the unicast transmission within a resource that at least partially overlaps in time.

19. The method of claim 17, wherein the monitoring capability indicates a number of receiver filters, antenna panels, or both, of the UE.

20. The method of claim 17, wherein the monitoring capability indicates a beam switch timing capability of the UE.

21. A method for wireless communications by a base station, comprising:
transmitting control signaling indicating a priority rule for a user equipment (UE) to apply for selecting to monitor a first beam associated with a first broadcast transmission, or a second beam that differs from the first beam and is associated with a unicast transmission, when a scheduling conflict is identified between the first broadcast transmission and the unicast transmission, wherein the priority rule specifies a priority of a broadcast control resource set associated with the first broadcast transmission relative to a second control resource set associated with the unicast transmission; and transmitting the first broadcast transmission using the first beam and the unicast transmission using the second beam.

22. The method of claim 21, wherein transmitting the first broadcast transmission using the first beam comprises:
transmitting a physical downlink control channel transmission within the broadcast control resource set.

23. The method of claim 21, further comprising:
transmitting a first grant in the broadcast control resource set scheduling the first broadcast transmission that is a data transmission in a first resource; and
transmitting a second grant scheduling the unicast transmission in a second resource that occurs within a defined amount of time of the first resource.

24. The method of claim 21, further comprising:
transmitting a first grant in a broadcast control channel scheduling the first broadcast transmission in a first resource, the first grant being scrambled with a group identifier of a group to which the UE belongs; and
transmitting a second grant scheduling the unicast transmission in a second resource that occurs within a defined amount of time of the first resource.

25. An apparatus for wireless communications by a user equipment (UE), comprising:
a processor, and
memory coupled to the processor, the memory comprising instructions executable by the processor to cause the apparatus to:
receive control signaling indicating a priority rule for selecting to monitor a first beam associated with a first broadcast transmission, or a second beam that differs from the first beam and is associated with a unicast transmission, when a scheduling conflict is identified between the first broadcast transmission and the unicast transmission, wherein the priority rule specifies a priority of a broadcast control resource set associated with the first broadcast transmission relative to a second control resource set associated with the unicast transmission; and
monitor, in accordance with the priority rule, one of the first beam or the second beam based at least in part on identification of the scheduling conflict.

26. An apparatus for wireless communications by a base station, comprising:
a processor, and
memory coupled to the processor, the memory comprising instructions executable by the processor to cause the apparatus to:
transmit control signaling indicating a priority rule for a user equipment (UE) to apply for selecting to monitor a first beam associated with a first broadcast transmission, or a second beam that differs from the first beam and is associated with a unicast transmission, when a scheduling conflict is identified between the first broadcast transmission and the unicast transmission, wherein the priority rule specifies a priority of a broadcast control resource set associated with the first broadcast transmission relative to a second control resource set associated with the unicast transmission; and
transmit the first broadcast transmission using the first beam and the unicast transmission using the second beam.

* * * * *